(12) United States Patent
Liu et al.

(10) Patent No.: US 10,656,434 B2
(45) Date of Patent: May 19, 2020

(54) DISPLAY DEVICE WITH TWO DISPLAY PANELS

(71) Applicants: HannStar Display (Nanjing) Corporation, Nanjing (CN); HannStar Display Corporation, Taipei (TW)

(72) Inventors: Yu-Chen Liu, Taichung (TW); Wei-Chih Hsu, Taichung (TW); Yen-Chung Chen, Taichung (TW)

(73) Assignees: HannStar Display (Nanjing) Corporation, Nanjing (CN); HannStar Display Corporation, Taipei (TW)

( * ) Notice: Subject to any disclaimer, the term of this patent is extended or adjusted under 35 U.S.C. 154(b) by 139 days.

(21) Appl. No.: 15/642,352

(22) Filed: Jul. 6, 2017

(65) Prior Publication Data

US 2018/0188551 A1    Jul. 5, 2018

(30) Foreign Application Priority Data

Dec. 29, 2016  (CN) .......................... 2016 1 1244071

(51) Int. Cl.
*G02B 27/22*     (2018.01)
*G02B 30/25*     (2020.01)
(Continued)

(52) U.S. Cl.
CPC ............. *G02B 30/25* (2020.01); *G02B 30/26* (2020.01); *G02B 30/27* (2020.01); *G02B 30/50* (2020.01); *G02F 1/1347* (2013.01); *H04N 13/30* (2018.05)

(58) Field of Classification Search
CPC .... G02B 27/22; G02B 27/26; G02B 27/2214; G02B 27/2221; G02B 27/2235; G02B 27/225; G02B 27/2278; G02B 27/28; G02B 27/281; G02B 27/286; G02B 27/2271; G02B 5/30–3025; G02B 30/50; G02B 30/26; G02B 30/27; G02B 30/25; H04N 13/30; G09G 3/36; G09G 3/00; G02F 1/133; G02F 1/1347; H01L 27/32–3202; H01L 27/3209; H01L 27/3267; H01L 27/3286
(Continued)

(56) References Cited

U.S. PATENT DOCUMENTS 6,204,967 B1   3/2001  Morishima et al.
6,304,378 B1  10/2001  Kobayashi
(Continued)

FOREIGN PATENT DOCUMENTS

CN      101059619 A    10/2007
CN      101236324 A     8/2008
(Continued)

*Primary Examiner* — Stephone B Allen
*Assistant Examiner* — Jyotsna V Dabbi
(74) *Attorney, Agent, or Firm* — CKC & Partners Co., LLC

(57) ABSTRACT

The display device includes a first display panel and a second display panel. The first display panel includes first pixel structures having a first pixel pitch. The second display panel includes second pixel structures having a second pixel pitch. The first display panel is overlapped with the second display panel. A user would not see a moiré pattern generated by the display device by adjusting the first pixel pitch, the second pixel pitch, and an effective distance between the first display panel and the second display panel.

17 Claims, 14 Drawing Sheets

(51) Int. Cl.
*G02F 1/1347* (2006.01)
*H04N 13/30* (2018.01)
*G02B 30/26* (2020.01)
*G02B 30/27* (2020.01)
*G02B 30/50* (2020.01)

(58) Field of Classification Search
USPC .......... 359/462, 463, 478; 345/4, 6, 36, 87, 345/102, 204; 349/15
See application file for complete search history.

(56) References Cited

U.S. PATENT DOCUMENTS

| | | |
|---|---|---|
| 2008/0180587 A1 | 7/2008 | Tomizuka et al. |
| 2010/0002018 A1* | 1/2010 | Hirata .................... G09G 5/028 345/690 |
| 2011/0215991 A1 | 9/2011 | Nakazaki et al. |
| 2017/0124931 A1* | 5/2017 | Bell ....................... H04N 13/00 |

FOREIGN PATENT DOCUMENTS

| | | | |
|---|---|---|---|
| CN | 101897196 A | 11/2010 | |
| CN | 202110356 U | 1/2012 | |
| CN | 102955302 A | 3/2013 | |
| CN | 103348687 A | 10/2013 | |
| CN | 103487980 A | 1/2014 | |
| CN | 104994373 A | 10/2015 | |
| CN | 106249491 A | 12/2016 | |
| EP | 1081508 A2 | 3/2001 | |
| JP | H06250291 A | 9/1994 | |
| WO | 2016117325 A1 | 7/2016 | |
| WO | WO-2016117325 A1 * | 7/2016 | ............. G09G 3/003 |

\* cited by examiner

| y \ x | 500 | 600 | 700 | 800 | 900 | 1000 | 1100 | 1200 | 1300 | 1400 | 1500 |
|---|---|---|---|---|---|---|---|---|---|---|---|
| 0 | 0.2 | 0.2 | 0.2 | 0.2 | 0.2 | 0.2 | 0.2 | 0.2 | 0.2 | 0.2 | 0.2 |
| 5 | 0.19 | 0.19 | 0.19 | 0.19 | 0.2 | 0.2 | 0.2 | 0.2 | 0.2 | 0.2 | 0.2 |
| 10 | 0.25 | 0.23 | 0.21 | 0.2 | 0.19 | 0.19 | 0.19 | 0.19 | 0.19 | 0.19 | 0.19 |
| 15 | 0.37 | 0.3 | 0.26 | 0.24 | 0.23 | 0.21 | 0.21 | 0.2 | 0.2 | 0.19 | 0.19 |
| 20 | 0.63 | 0.43 | 0.34 | 0.29 | 0.27 | 0.25 | 0.23 | 0.22 | 0.22 | 0.21 | 0.2 |
| 25 | 1.28 | 0.77 | 0.49 | 0.38 | 0.33 | 0.29 | 0.27 | 0.25 | 0.24 | 0.23 | 0.22 |
| 30 | 0.98 | 1.01 | 0.87 | 0.55 | 0.42 | 0.36 | 0.32 | 0.29 | 0.27 | 0.26 | 0.25 |
| 35 | 0.44 | 1.26 | 1.84 | 0.95 | 0.6 | 0.46 | 0.39 | 0.35 | 0.31 | 0.29 | 0.28 |
| 40 | 0.28 | 0.55 | 1.58 | 0.37 | 1.03 | 0.65 | 0.5 | 0.42 | 0.37 | 0.34 | 0.31 |
| 45 | 0.33 | 0.35 | 0.66 | 1.95 | 3.62 | 1.1 | 0.7 | 0.54 | 0.45 | 0.4 | 0.36 |
| 50 | 0.48 | 0.27 | 0.41 | 0.7 | 2.39 | 3.36 | 1.17 | 0.75 | 0.58 | 0.48 | 0.42 |

FIG. 7A

| y \ x | 500 | 600 | 700 | 800 | 900 | 1000 | 1100 | 1200 | 1300 | 1400 | 1500 |
|---|---|---|---|---|---|---|---|---|---|---|---|
| 0 | 0.28 | 0.29 | 0.29 | 0.29 | 0.29 | 0.29 | 0.29 | 0.29 | 0.29 | 0.29 | 0.29 |
| 5 | 0.23 | 0.23 | 0.23 | 0.24 | 0.24 | 0.25 | 0.25 | 0.26 | 0.26 | 0.26 | 0.26 |
| 10 | 0.24 | 0.24 | 0.24 | 0.23 | 0.23 | 0.26 | 0.23 | 0.23 | 0.23 | 0.24 | 0.24 |
| 15 | 0.26 | 0.25 | 0.24 | 0.24 | 0.24 | 0.24 | 0.23 | 0.23 | 0.23 | 0.23 | 0.23 |
| 20 | 0.27 | 0.26 | 0.25 | 0.25 | 0.24 | 0.24 | 0.24 | 0.24 | 0.24 | 0.23 | 0.23 |
| 25 | 0.29 | 0.27 | 0.26 | 0.26 | 0.25 | 0.25 | 0.25 | 0.24 | 0.24 | 0.24 | 0.24 |
| 30 | 0.31 | 0.29 | 0.28 | 0.27 | 0.26 | 0.26 | 0.25 | 0.25 | 0.25 | 0.24 | 0.24 |
| 35 | 0.33 | 0.3 | 0.29 | 0.28 | 0.27 | 0.26 | 0.26 | 0.25 | 0.25 | 0.25 | 0.25 |
| 40 | 0.35 | 0.32 | 0.3 | 0.29 | 0.28 | 0.27 | 0.26 | 0.26 | 0.26 | 0.25 | 0.25 |
| 45 | 0.38 | 0.34 | 0.32 | 0.3 | 0.29 | 0.28 | 0.27 | 0.27 | 0.26 | 0.26 | 0.26 |
| 50 | 0.42 | 0.36 | 0.33 | 0.31 | 0.3 | 0.29 | 0.28 | 0.27 | 0.27 | 0.26 | 0.26 |

FIG. 7B

| y\x | 500 | 600 | 700 | 800 | 900 | 1000 | 1100 | 1200 | 1300 | 1400 | 1500 |
|---|---|---|---|---|---|---|---|---|---|---|---|
| 0 | 0.2 | 0.2 | 0.2 | 0.2 | 0.2 | 0.2 | 0.2 | 0.2 | 0.2 | 0.2 | 0.2 |
| 5 | 0.22 | 0.21 | 0.21 | 0.21 | 0.21 | 0.21 | 0.21 | 0.21 | 0.21 | 0.21 | 0.21 |
| 10 | 0.23 | 0.22 | 0.22 | 0.22 | 0.22 | 0.21 | 0.21 | 0.21 | 0.21 | 0.21 | 0.21 |
| 15 | 0.24 | 0.23 | 0.23 | 0.23 | 0.22 | 0.22 | 0.22 | 0.22 | 0.22 | 0.22 | 0.21 |
| 20 | 0.26 | 0.25 | 0.24 | 0.23 | 0.23 | 0.23 | 0.22 | 0.22 | 0.22 | 0.22 | 0.22 |
| 25 | 0.28 | 0.26 | 0.25 | 0.24 | 0.24 | 0.23 | 0.23 | 0.23 | 0.23 | 0.22 | 0.22 |
| 30 | 0.3 | 0.28 | 0.26 | 0.25 | 0.25 | 0.24 | 0.24 | 0.23 | 0.23 | 0.23 | 0.23 |
| 35 | 0.33 | 0.3 | 0.28 | 0.27 | 0.26 | 0.25 | 0.24 | 0.24 | 0.24 | 0.23 | 0.23 |
| 40 | 0.36 | 0.32 | 0.29 | 0.38 | 0.27 | 0.26 | 0.25 | 0.25 | 0.24 | 0.24 | 0.24 |
| 45 | 0.39 | 0.34 | 0.31 | 0.29 | 0.28 | 0.27 | 0.26 | 0.25 | 0.25 | 0.25 | 0.24 |
| 50 | 0.44 | 0.37 | 0.33 | 0.31 | 0.29 | 0.28 | 0.27 | 0.26 | 0.26 | 0.25 | 0.25 |

FIG. 7C

| y\x | 500 | 600 | 700 | 800 | 900 | 1000 | 1100 | 1200 | 1300 | 1400 | 1500 |
|---|---|---|---|---|---|---|---|---|---|---|---|
| 0 | 0.24 | 0.24 | 0.24 | 0.24 | 0.24 | 0.24 | 0.24 | 0.24 | 0.24 | 0.24 | 0.24 |
| 5 | 0.23 | 0.23 | 0.23 | 0.23 | 0.24 | 0.24 | 0.24 | 0.24 | 0.24 | 0.24 | 0.24 |
| 10 | 0.27 | 0.25 | 0.23 | 0.23 | 0.23 | 0.23 | 0.23 | 0.23 | 0.23 | 0.23 | 0.23 |
| 15 | 0.38 | 0.32 | 0.28 | 0.26 | 0.25 | 0.24 | 0.23 | 0.23 | 0.23 | 0.23 | 0.23 |
| 20 | 0.68 | 0.44 | 0.36 | 0.32 | 0.29 | 0.27 | 0.26 | 0.25 | 0.24 | 0.23 | 0.23 |
| 25 | 1.99 | 0.72 | 0.49 | 0.4 | 0.35 | 0.31 | 0.29 | 0.28 | 0.26 | 0.25 | 0.25 |
| 30 | 1.83 | 1.94 | 0.78 | 0.54 | 0.44 | 0.38 | 0.34 | 0.31 | 0.3 | 0.28 | 0.27 |
| 35 | 0.62 | 2.78 | 1.9 | 0.84 | 0.59 | 0.47 | 0.41 | 0.36 | 0.34 | 0.31 | 0.3 |
| 40 | 0.38 | 0.81 | 4.44 | 1.87 | 0.89 | 0.63 | 0.5 | 0.43 | 0.39 | 0.36 | 0.33 |
| 45 | 0.36 | 0.47 | 1.02 | 4.06 | 1.85 | 0.93 | 0.66 | 0.54 | 0.46 | 0.41 | 0.38 |
| 50 | 0.5 | 0.33 | 0.58 | 1.28 | 22.06 | 1.84 | 0.97 | 0.7 | 0.55 | 0.49 | 0.43 |

FIG. 7D

| x\y | 500 | 600 | 700 | 800 | 900 | 1000 | 1100 | 1200 | 1300 | 1400 | 1500 |
|---|---|---|---|---|---|---|---|---|---|---|---|
| 0 | 38.65 | 42.78 | 49.9 | 57.03 | 64.15 | 71.28 | 78.4 | 85.53 | 92.65 | 99.78 | 106.9 |
| 5 | 3.44 | 4.12 | 4.81 | 5.5 | 6.18 | 6.87 | 7.56 | 8.24 | 8.93 | 9.62 | 10.3 |
| 10 | 1.81 | 2.17 | 2.53 | 2.89 | 3.25 | 3.61 | 3.97 | 4.33 | 4.67 | 5.05 | 5.41 |
| 15 | 1.22 | 1.47 | 1.71 | 1.96 | 2.2 | 2.45 | 2.69 | 2.94 | 3.18 | 3.43 | 3.67 |
| 20 | 0.93 | 1.11 | 1.3 | 1.48 | 1.67 | 1.85 | 2.04 | 2.22 | 2.41 | 2.59 | 2.78 |
| 25 | 0.74 | 0.89 | 1.04 | 1.19 | 1.34 | 1.49 | 1.64 | 1.79 | 1.94 | 2.08 | 2.23 |
| 30 | 0.62 | 0.75 | 0.87 | 1 | 1.12 | 1.24 | 1.37 | 1.49 | 1.62 | 1.74 | 1.87 |
| 35 | 0.54 | 0.64 | 0.75 | 0.86 | 0.96 | 1.07 | 1.18 | 1.28 | 1.39 | 1.5 | 1.6 |
| 40 | 0.47 | 0.56 | 0.66 | 0.75 | 0.84 | 0.94 | 1.03 | 1.13 | 1.22 | 1.31 | 1.41 |
| 45 | 0.42 | 0.5 | 0.58 | 0.67 | 0.75 | 0.83 | 0.92 | 1 | 1.08 | 1.17 | 1.25 |
| 50 | 0.38 | 0.45 | 0.53 | 0.6 | 0.68 | 0.75 | 0.83 | 0.9 | 0.98 | 1.05 | 1.13 |

FIG. 9

DISPLAY DEVICE WITH TWO DISPLAY PANELS

RELATED APPLICATIONS

This application claims priority to China Application Serial Number 201611244071.1 filed Dec. 29, 2016, which is herein incorporated by reference.

BACKGROUND

Field of Invention

The present invention relates to a display device. More particularly, the present invention relates to the display device with two display panels.

Description of Related Art

Two human eyes see an object from different angles so that the images received by the eyes are slightly different. The difference is called disparity, and human brain determines the depth of the object according to the disparity. A 3D (3-dimensional) image is generated by a relative distance of each object in the field of view. A 3D technology uses the principle of the disparity and a variety of optical technologies to make left eye and right eye receive different images, thereby enabling a viewer to see the 3D image. In the conventional technology, a 3D vision effect is generated by glasses such as glasses with red and blue filters, or polarized glasses, in which two eyes see different images through the filter mechanism of the glasses.

An autostereoscopy technology also uses the principle of disparity to make the two eyes receive different images by optical technologies of a screen. Typical autostereoscopy technologies include Parallax Barriers and Lenticular Lenses, but disadvantages of the technologies include: a clear 3D image can only be seen at a particular angle, and a user often feels dizzy after long-term viewing. In another autostereoscopy technology, two overlapped display panels are disposed spaced from each other by a distance. The two display panels render different images. Therefore, a user can see the 3D image and would not feel dizzy. However, a moiré pattern is generated because the two display panels are overlapped. It is an issue for the people in the art regarding how to address the problem.

SUMMARY

A display device is provided in the invention to prevent the aforementioned display device from generating the moiré pattern.

Embodiments of the present invention provide a display device including a first display panel and a second display panel. The first display panel includes a first polarizer, a first substrate, a second substrate and multiple first pixel structures. The first substrate is disposed between the first polarizer and the second substrate, and the first pixel structures have a first pixel pitch. The second display panel includes a third substrate, a fourth substrate, a second polarizer and multiple second pixel structures. The fourth substrate is disposed between the third substrate and the second polarizer, the third substrate is disposed between the second substrate and the fourth substrate, and the second pixel structures have a second pixel pitch. The first polarizer has a thickness $d_1$ and a refractive index $n_1$. The first substrate has a thickness $d_2$ and a refractive index $n_2$. The second substrate has a thickness $d_3$ and a refractive index $n_3$. The third substrate has a thickness $d_6$ and a refractive index $n_6$. A moiré pitch of a moiré pattern generated by the display device is calculated according to an equation (1):

$$Pitch_{moire} = \left( \left| \frac{L' + d_1' + d_2'}{\frac{n \times (L' + d_1' + d_2' + d_3' + K' + d_6')}{P_{bottom}} - \frac{m \times (L' + d_1' + d_2')}{P_{top}}} \right| \right) \quad (1)$$

$$L' = \frac{L}{n_L} \quad (2)$$

$$K' = \frac{K}{n_K} \quad (3)$$

$$d_i' = \frac{d_i}{n_i}, i = 1, 2, 3, 6 \quad (4)$$

In the equations (1) to (4), m and n are positive integers, L is a viewing distance between a user and the first display panel, K is a distance between the first display panel and the second display panel, $P_{top}$ is the first pixel pitch, $P_{bottom}$ is the second pixel pitch, $n_L$ is a refractive index of a medium between the user and the first display panel, $n_K$ is a refractive index of a medium between the first display panel and the second display panel. When m=1 and n=1, the moiré pitch is less than 500 micrometer.

In some embodiments, the first display panel includes a first polarizer, a first substrate, a second substrate and multiple first pixel structures. The first substrate is disposed between the first polarizer and the second substrate, and the first pixel structures have a first pixel pitch. The second display panel includes a third substrate, a fourth substrate, a second polarizer and multiple second pixel structures. The fourth substrate is disposed between the third substrate and the second polarizer, the third substrate is disposed between the second substrate and the fourth substrate, and the second pixel structures have a second pixel pitch. One of the first display panel and the second display panel further includes a third polarizer disposed between the second substrate and the third substrate. The first polarizer has a thickness $d_1$ and a refractive index $n_1$. The first substrate has a thickness $d_2$ and a refractive index $n_2$. The second substrate has a thickness $d_3$ and a refractive index $n_3$. The third polarizer has a thickness $d_4$ and a refractive index $n_4$. The third substrate has a thickness $d_6$ and a refractive index $n_6$. A moiré pitch of a moiré pattern generated by the display device is calculated according to an equation (5):

$$Pitch_{moire} = \left( \left| \frac{L' + d_1' + d_2'}{\frac{n \times (L' + d_1' + d_2' + d_3' + d_4' + K' + d_6')}{P_{bottom}} - \frac{m \times (L' + d_1' + d_2')}{P_{top}}} \right| \right) \quad (5)$$

$$L' = \frac{L}{n_L} \quad (6)$$

$$K' = \frac{K}{n_K} \quad (7)$$

$$d_i' = \frac{d_i}{n_i}, i = 1, 2, 3, 4, 6 \quad (8)$$

In the equations (5) to (8), m and n are positive integers, L is a viewing distance between a user and the first display panel, K is a distance between the first display panel and the second display panel, $P_{top}$ is the first pixel pitch, $P_{bottom}$ is the second pixel pitch, $n_L$ is a refractive index of a medium between the user and the first display panel, $n_K$ is a refractive index of a medium between the first display panel and the second display panel. When m=1 and n=1, the moiré pitch is less than 500 micrometer.

In some embodiments, the first display panel includes a first polarizer, a first substrate, a second substrate, a third polarizer and multiple first pixel structures. The first substrate is disposed between the first polarizer and the second substrate, the second substrate is disposed between the first substrate and the third polarizer substrate, and the first pixel structures have a first pixel pitch. The second display panel includes a fourth polarizer, a third substrate, a fourth substrate, a second polarizer and multiple second pixel structures. The third substrate is disposed between the fourth polarizer and the fourth substrate, the fourth substrate is disposed between the third substrate and the second polarizer, the fourth polarizer is disposed between the third polarizer and the third substrate, and the second pixel structures have a second pixel pitch. The first polarizer has a thickness $d_1$ and a refractive index $n_1$. The first substrate has a thickness $d_2$ and a refractive index $n_2$. The second substrate has a thickness $d_3$ and a refractive index $n_3$. The third polarizer has a thickness $d_4$ and a refractive index $n_4$. The fourth polarizer has a thickness $d_5$ and a refractive index $n_5$. The third substrate has a thickness $d_6$ and a refractive index $n_6$. A moiré pitch of a moiré pattern generated by the display device is calculated according to an equation (9):

$$Pitch_{moire} = \left( \frac{L' + d_1' + d_2'}{\left| n \times \left( \frac{L' + d_1' + d_2' + d_3' + d_4' +}{K' + d_5' + d_6'} \right) - \frac{m \times (L' + d_1' + d_2')}{P_{top}} \right|} \right) \quad (9)$$

$$L' = \frac{L}{n_L} \quad (10)$$

$$K' = \frac{K}{n_K} \quad (11)$$

$$d_i' = \frac{d_i}{n_i}, i = 1 \text{ to } 6 \quad (12)$$

In the equations (9) to (12), m and n are positive integers, L is a viewing distance between a user and the first display panel, K is a distance between the first display panel and the second display panel, $P_{top}$ is the first pixel pitch, $P_{bottom}$ is the second pixel pitch, $n_L$ is a refractive index of a medium between the user and the first display panel, $n_K$ is a refractive index of a medium between the first display panel and the second display panel. When m=1 and n=1, the moiré pitch is less than 500 micrometers.

In some embodiments, when a sum of m and n is greater than 2 and smaller than or equal to 9, the moiré pitch is less than 500 micrometers.

In some embodiments, the first pixel pitch is different from the second pixel pitch.

In some embodiments, the first pixel pitch is smaller than the second pixel pitch.

In some embodiments, the first display panel is bonded to the second display panel by an adhesive layer.

In some embodiments, the material of the adhesive layer includes an adhesive which is a frame-shape adhesive, a film-type adhesive or a liquid-type adhesive.

In some embodiments, a ratio $K/n_K$ of the distance K to the refractive index $n_K$ is in a range from 5 millimeters (mm) to 10 mm.

In some embodiments, the first pixel pitch is equal to the second pixel pitch, and the distance K between the first display panel and the second display panel satisfies an equation (13):

$$K' > \frac{1}{500}(L' \times P) \quad (13)$$

In the equation (13), $P_{top} = P_{bottom} = P$. The unit of L' is millimeter. The unit of P is micrometer. The unit of K is millimeter.

BRIEF DESCRIPTION OF THE DRAWINGS

The invention can be more fully understood by reading the following detailed description of the embodiment, with reference made to the accompanying drawings as follows.

FIG. 6A to FIG. 6D show tables containing experiment data of moiré pitch calculated by taking pitches of pixel structures as variables.

FIG. 7A to FIG. 7D show tables containing experiment data of moiré pitch calculated by taking viewing distance and distance between panels as variables.

FIG. 9 shows a table containing experiment data of moiré pitch calculated by taking viewing distance and distance between panels as variables.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
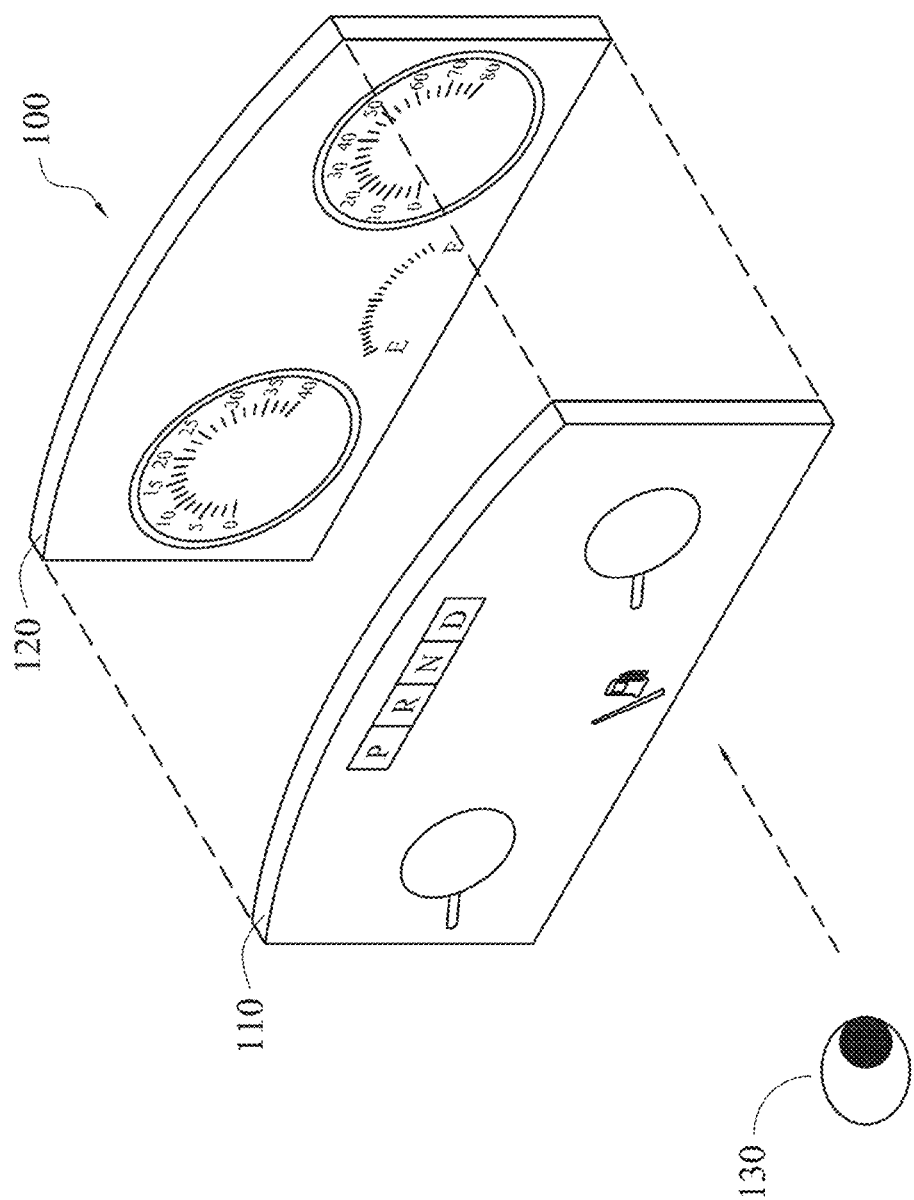
FIG. 1 is a perspective view of a display device in accordance with an embodiment.
Figure 2:
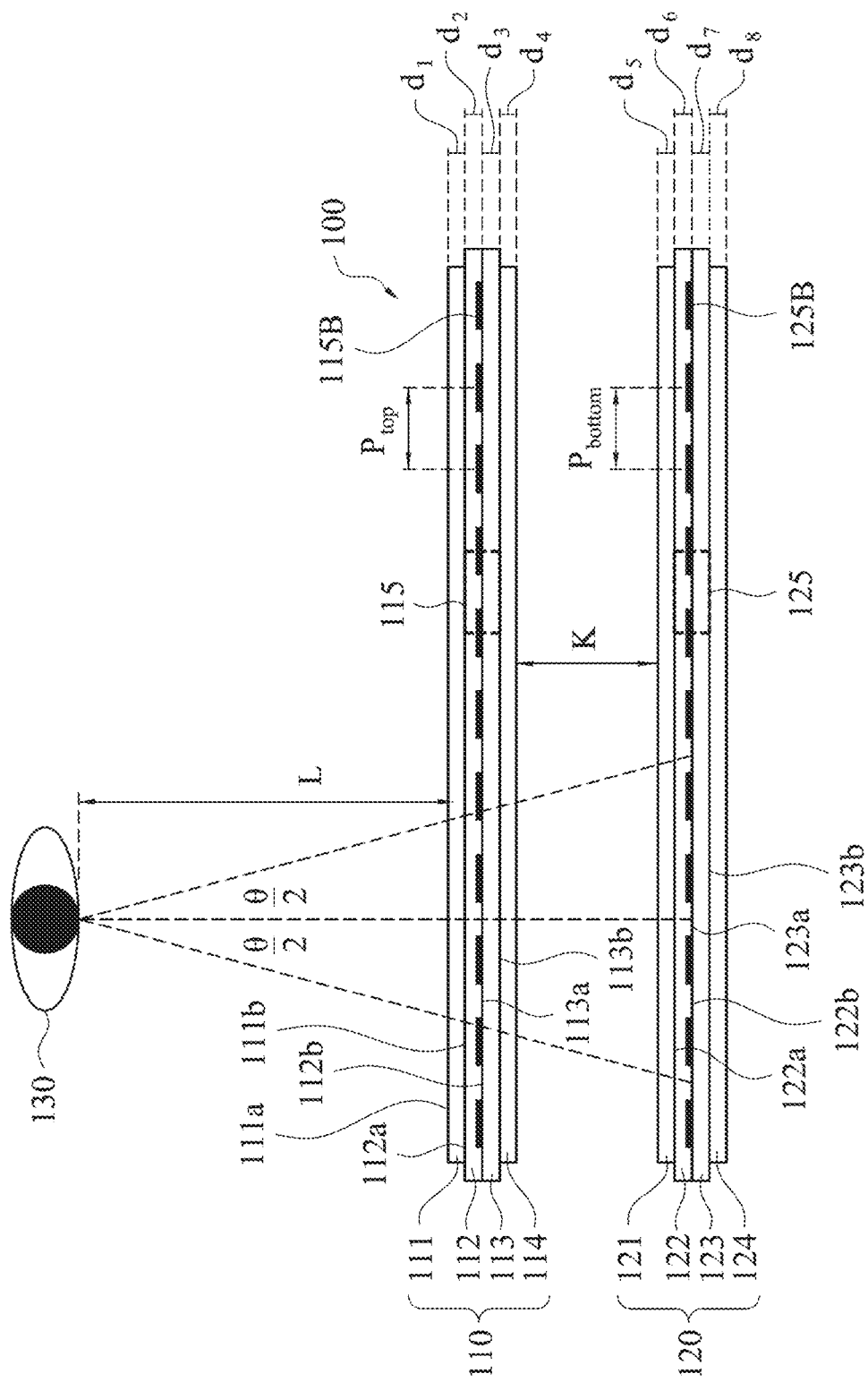
FIG. 2 is a cross-sectional view of a display device in accordance with the embodiment of FIG. 1.

Referring to FIG. 1 and FIG. 2, FIG. 1 is a perspective view of a display device in accordance with an embodiment, and FIG. 2 is a cross-sectional view of the display device in accordance with the embodiment of FIG. 1. A display device 100 includes a display panel 110 (also referred to as a first display panel) and a display panel 120 (also referred to as a second display panel). The display panel 110 is overlapped with the display panel 120. The display device 100 is a screen in a vehicle in the embodiment, but it may also be a television, a computer screen, a cell-phone screen, or a screen on any other electrical device, which is not limited in the invention. As shown in FIG. 1, the display panel 110 and the display panel 120 render different images respectively. The distance between a user 130 and the image on the display panel 110 is shorter than the distance between the user 130 and the image on the display panel 120. Therefore, the user 130 can see a 3D image.

A polarizer 111 (also referred to as a first polarizer) and a polarizer 124 (also referred to as a second polarizer) are disposed at two sides of the display device 100. The display panel 110 includes the polarizer 111, a substrate 112 (also referred to as a first substrate), a substrate 113 (also referred to as a second substrate) and a polarizer 114 (also referred to as a third polarizer). In detail, the polarizer 111 has two surfaces 111a and 111b opposite to each other. The surface 111a faces the user 130, and the surface 111b faces the substrate 112. The substrate 112 has a first side 112a and a second side 112b opposite to each other. The polarizer 111 is disposed at the first side 112a of the substrate 112, and the substrate 113 and the polarizer 114 are disposed at the second side 112b of the substrate 112. The substrate 113 has a first side 113a and a second side 113b opposite to each other. The polarizer 111 and the substrate 112 are disposed at the first side 113a of the substrate 113, and the polarizer 114 is disposed at the second side 113b of the substrate 113. The polarizer 111 has a thickness $d_1$ and a refractive index $n_1$; the substrate 112 has a thickness $d_2$ and a refractive index $n_2$; the substrate 113 has a thickness $d_3$ and a refractive index $n_3$; the polarizer 114 has a thickness $d_4$ and a refractive index $n_4$. In addition, the display panel 110 further includes multiple pixel structures 115 (also referred to as first pixel structures), and the pixel structures 115 have a pixel pitch $P_{top}$ (also referred to as a first pixel pitch).

The display panel 120 includes a polarizer 121 (also referred to as a fourth polarizer), a substrate 122 (also referred to as a third substrate), a substrate 123 (also referred to as a fourth substrate) and the polarizer 124. In detail, the substrate 122 has a first side 122a and a second side 122b opposite to each other. The polarizer 121 is disposed at the first side 122a of the substrate 122. The substrate 123 and polarizer 124 are disposed at the second side 122b of the substrate 122. The substrate 123 has a first side 123a and a second side 123b opposite to each other. The polarizer 121 and the substrate 122 are disposed at the first side 123a of the substrate 123, and the polarizer 124 is disposed at the second side 123b of the substrate 123. The polarizer 121 has a thickness $d_5$ and a refractive index $n_5$; the substrate 122 has a thickness $d_6$ and a refractive index $n_6$; the substrate 123 has a thickness $d_7$ and a refractive index $n_7$; the polarizer 124 has a thickness $d_8$ and a refractive index $n_8$. In addition, the display panel 120 further includes multiple pixel structures 125 (also referred to as second pixel structures). The pixel structures 125 have a pixel pitch $P_{bottom}$ (also referred to as a second pixel pitch). Note that in the embodiment that the display panels 110 and 120 are color panels, the pixel structures 115 and 125 are pixel structures of sub-pixel units. For example, in the embodiment that the display panel has 3 colors (i.e. RGB) of sub-pixel, three pixel structures 115 (or 125) representing red, green and blue respectively and constitute a pixel.

In some embodiments, the display device 100 further includes a backlight module. For example, the backlight module may be disposed at the side of the display panel 120 opposite to the display panel 110. In other words, the backlight module, the display panel 120 and display panel 110 are sequentially stacked and form the display device.

In the embodiment, the display panels 110 and 120 are in a fringe field switching (FFS) mode. However, the invention is not limited thereto. The display panels 110 and 120 may be in an in-plane switching (IPS) mode, a twisted nematic (TN) mode, a vertical alignment (VA) mode, an optically compensated bend (OCB) mode, an organic light emitting diode (OLED) mode or any other suitable mode. Besides, in some embodiments, the display panels 110 and 120 may be display panels in different modes. For example, the display panels 110 and 120 may be respectively FFS and VA modes, IPS and VA modes, or FFS and TN modes.

In some embodiments, liquid crystal layers are disposed between the first substrate 112 and the second substrate 113 and between the third substrate 122 and the fourth substrate 123. Thin film transistors may be disposed on the first side 113a of the second substrate 113 and the first side 123a of the fourth substrate 123, and color filter (CF) layers may be disposed on the second side 112b of the first substrate 112 and the second side 122b of the third substrate 122. Light shielding layers 115B and 125B (e.g. black matrix layer) are respectively formed at the second side 112b of the first substrate 112 and the second side 122b of the third substrate 122 for partially masking the pixel structures 115 and 125 so as to avoid light leakage that may affect the visual effect of the display device 100. However, the invention is not limited thereto, in an embodiment of Color Filter on Array (COA), the TFT arrays, the color filter layers and the light shielding layers are disposed on the second substrate 113 and the fourth substrate 123.

The display device 100 includes four polarizers in the embodiment. But in some embodiments, the display device 100 may include only three polarizers (i.e. polarizers 111, 114 and 124 without the polarizer 121, or including the polarizers 111, 121 and 124 without the polarizer 114). In other embodiments, the display device 100 may include only two polarizers (i.e. the polarizers 111 and 124 without the polarizers 114 and 121), in which the polarizers 111 and 124 are linear polarizers having axes perpendicular to each other. Alternatively, the polarizers 111 and 124 may be a left-handed circular polarizer and a right-handed circular polarizer respectively.

The user's eyes 130 are spaced from the display device 100 by a viewing distance L. That is, the distance between the user's eyes and the surface 111a of the first polarizer 111 is equal to L. For example, when the display device 100 is a car screen (e.g. GPS and/or TV), the viewing distance may be in a range from 500 millimeters (mm) to 1500 mm. When the display device 100 is a dashboard of a vehicle, the viewing distance may be in a range from 500 mm to 1000 mm, which is not limited in the invention. When the display device 100 is a TV screen, the viewing distance L may be in a range from 2000 mm to 4000 mm. The display panel 110 is bonded to the display panel 120 and they are spaced from the each other by a distance K. For example, the distance K between the panels may be in a range from 0 mm (i.e. the display panel 110 is in direct contact with the display panel 120) to 50 mm. In general, the distance K may be set in a range from 5 mm to 20 mm, but the invention is not limited thereto. For example, the display panel 110 may be in direct contact with the display panel 120 (i.e. the distance K is 0 mm), and the display panel 110 and the display panel 120 are fixed by a frame. In addition, in other embodiments, the display panel 110 is bonded to the display panel 120 by an adhesive layer. The material of the adhesive layer may include an adhesive such as a frame-shape adhesive (i.e. double-sided adhesive tape), a film-type adhesive or a liquid-type adhesive, but the invention is not limited thereto. For example, the film-type adhesive may be Optically Clear Adhesive (OCA), and the liquid-type adhesive may be liquid Optically Clear Resin (OCR) (commonly referred as glue), which is not limited in the invention. The display panel 110 may be bonded to the display panel 120 by using the frame-shape adhesive (i.e. double-sided adhesive tape) to fix four edges of the display panel 110 and the display panel 120 (this way is also referred to as edge lamination), or by using the OCA or the OCR to bonding the display panel 110 to the display panel 120 completely (this way is also referred to as full lamination). When edge lamination is applied, a medium in the gap between the display panel 110 and the display panel 120 is air. When full lamination is applied, the medium in the gap between the display panel 110 and the display panel 120 is OCA or OCR.

The display panel 110 and the display panel 120 may display different images. For example, the display panel 110 may display foreground, and the display panel 120 may display background. As a result, the user would see the foreground in front of the background and thus see a 3D image. However, the invention does not intend to limit the images displayed on the display panel 110 and 120. In other embodiments, when a pixel of the display panel 110 is overlapped with a pixel in the display panel 120, the gray level of the pixel in the display panel 110 is greater than that of the pixel of the display panel 120. For example, in some embodiments, when the lowest grey level (e.g. 0) and the highest grey level (e.g. 255) respectively represent the lowest light transmittance and the highest light transmittance, the grey level of the pixel in the display panel 110 is greater than that of the pixel in the display panel 120 among the overlapped pixels, but the invention is not limited thereto. The larger the difference between the gray levels of the overlapped pixels in the display panel 110 and 120 is, the better the 3D effect of the display device is.

Because the pixel structures 115 and 125 have opaque metal lines (not shown) or the light shielding layer 115B and 125B would partially mask the pixel structures 115 and 125, the user 130 sees the opaque pattern as black lines. When the first display panel 110 is overlapped with the second display panel 120, the user 130 may see interference fringes because the distance between the first display panel 110 and the user 130 is different from the distance between the user 130 and the second display panel 120, and thus a moiré pattern is generated. Embodiments are provided below to described how to avoid the moiré pattern by controlling the pixel pitch $P_{top}$, the pixel pitch $P_{bottom}$, and the distance between the panels K.

Figure 3:
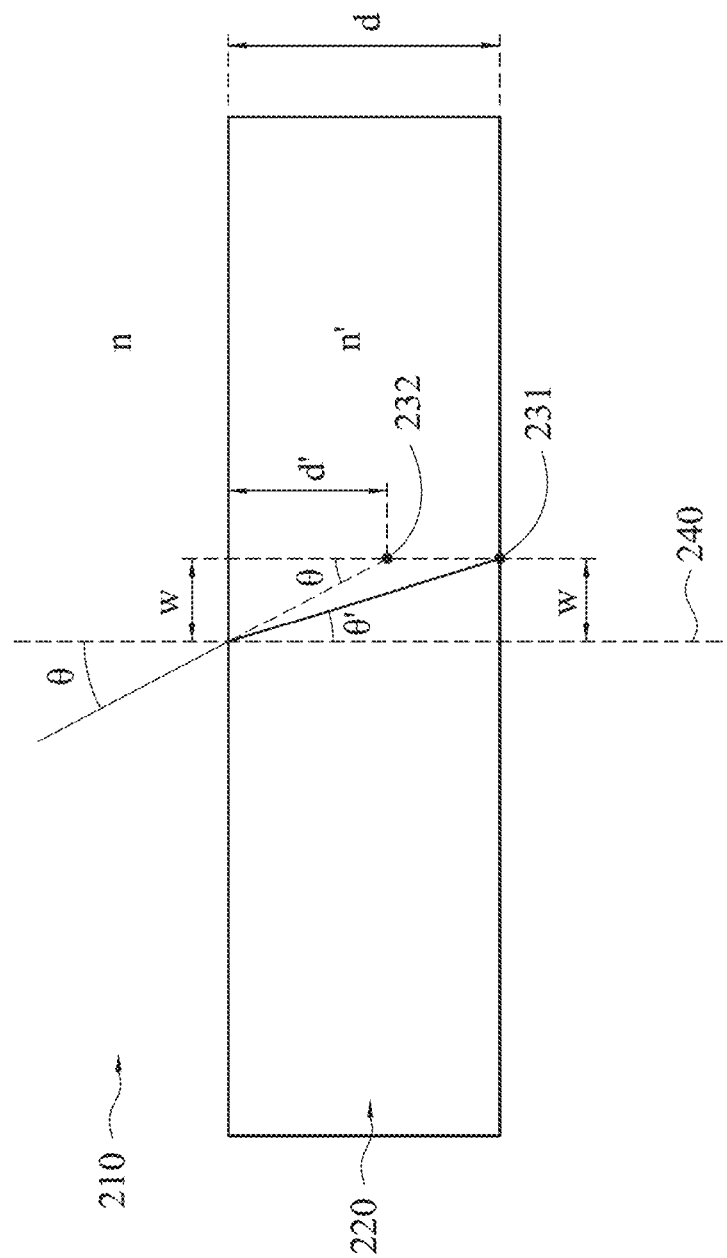
FIG. 3 is a schematic view illustrating the real depth and the vision depth in accordance with an embodiment.

Referring to FIG. 3, FIG. 3 is a schematic diagram illustrating a real depth and a vision depth when a user in a medium sees an object in another medium. As shown in FIG. 3, light is emitted from a medium 210 to a medium 220 with incidence angle θ and refraction angle θ'. The refractive index of the medium 210 is n, and the refractive index of the medium 220 is n'. The user sees the light from the medium 210. The medium 220 has the real depth d, but the vision depth seen by the user is d'. That is, a position 231 is seen as a position 232 by the user. The distance between the position 231 and the normal 240 is equal to that between the position 232 and the normal 240. Therefore, following equations (1) and (2) are satisfied.

$$w = d \times \tan\theta' = d' \times \tan\theta \quad (1)$$

$$d' = \frac{d \times \tan\theta'}{\tan\theta} \quad (2)$$

On the other hand, the following equations (3)-(5) are satisfied according to the law of refraction.

$$n \times \sin\theta = n' \times \sin\theta' \quad (3)$$

$$\sin\theta' = \frac{n \times \sin\theta}{n'} \quad (4)$$

$$\theta' = \sin^{-1}\left(\frac{n \times \sin\theta}{n'}\right) \quad (5)$$

If the equation (5) is substituted into the equation (2), then we can get the following equation (6).

$$d' = \frac{d \times \tan\left[\sin^{-1}\left(\frac{n \times \sin\theta}{n'}\right)\right]}{\tan\theta} \quad (6)$$

When the incidence angle θ is small (e.g. less than 5 degrees), the equation (6) is approximated by the following equation (7).

$$d' = \frac{n \times d}{n'} \quad (7)$$

In general, the medium 210 is air, and therefore the refractive index n in the equation (7) is 1. Referring to FIG. 2, in accordance with the result of the equation (7), a viewing distance L' (also referred to as a effective viewing distance), a distance between the panels K' (also referred to as an effective distance between the panels) and a thickness $d'_i$ (also referred to as a effective thickness) seen by the user can be written as the following equations (8)-(10).

$$L' = \frac{L}{n_L} \quad (8)$$

$$K' = \frac{K}{n_K} \quad (9)$$

$$d'_i = \frac{d_i}{n_i}, i = 1 \text{ to } 8 \quad (10)$$

$n_L$ is the refractive index of the medium (e.g. air) between the user 130 and the display device 100, and it is generally equal to 1 because the medium between the user 130 and the display device 100 is generally air. $n_K$ is the refractive index of the medium (may be air or transparent adhesive) between the display panel 110 and the display panel 120. For example, when the edge lamination is applied to bond the display panel 110 to the display panel 120, air is in the gap between the display panel 110 and the display panel 120, and therefore $n_K$ is equal to 1; and when the full lamination is applied to bond the display panel 110 to the display panel 120, $n_K$ is the refractive index of the adhesive. The refractive index of OCA or OCR is generally 1.5, but the invention is not limited thereto. $n_i$ (i=1, 4, 5 and 8) are the refractive indexes of the polarizers 111, 114, 121 and 124 respectively. $n_i$ (i=2, 3, 6 and 7) are the refractive indexes of the substrate 112, 113, 122 and 123 respectively. The vision depth for the user 130 to see the pixel structure 115 is L'+d'$_1$+d'$_2$, and the vision depth for the user 130 to see the pixel structure 125 is L'+d'$_1$+d'$_2$+d'$_3$+d'$_4$+K'+d'$_5$+d'$_6$. Assume the viewing angle of the user 130 is θ, then the width on the display panel 110 seen by the user 130 is 2×tan θ/2×(L'+d'$_1$+d'$_2$), and the width on the display panel 120 seen by the user 130 is 2×tan θ/2×(L'+d'$_1$+d'$_2$+d'$_3$+D'$_4$+K'+d'$_5$+d'$_6$).

Figure 4A:
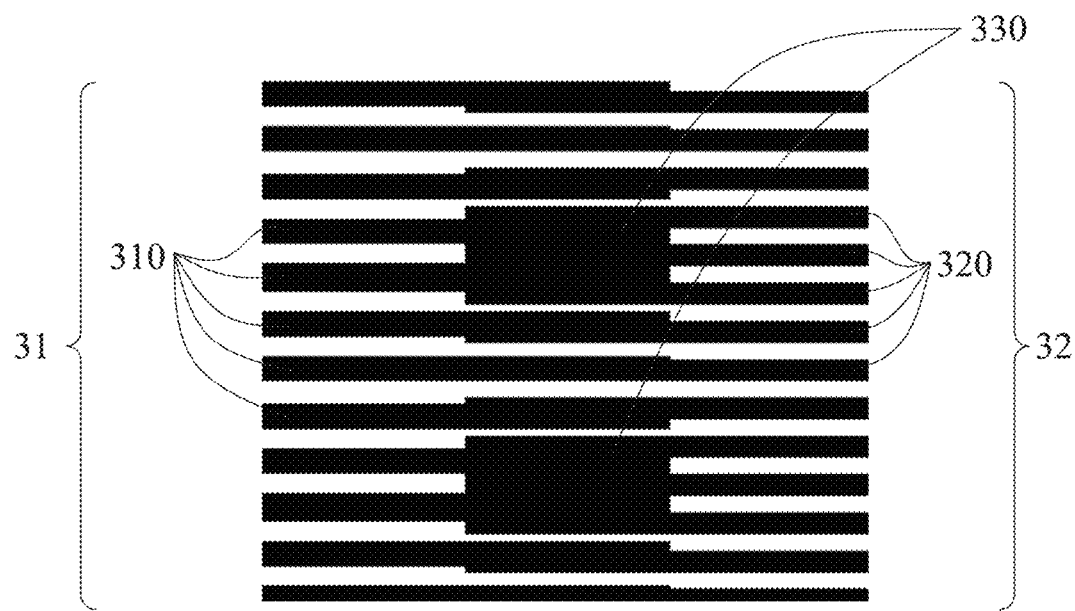
FIG. 4A and FIG. 4B are schematic views for explaining moiré pattern.
Figure 4B:
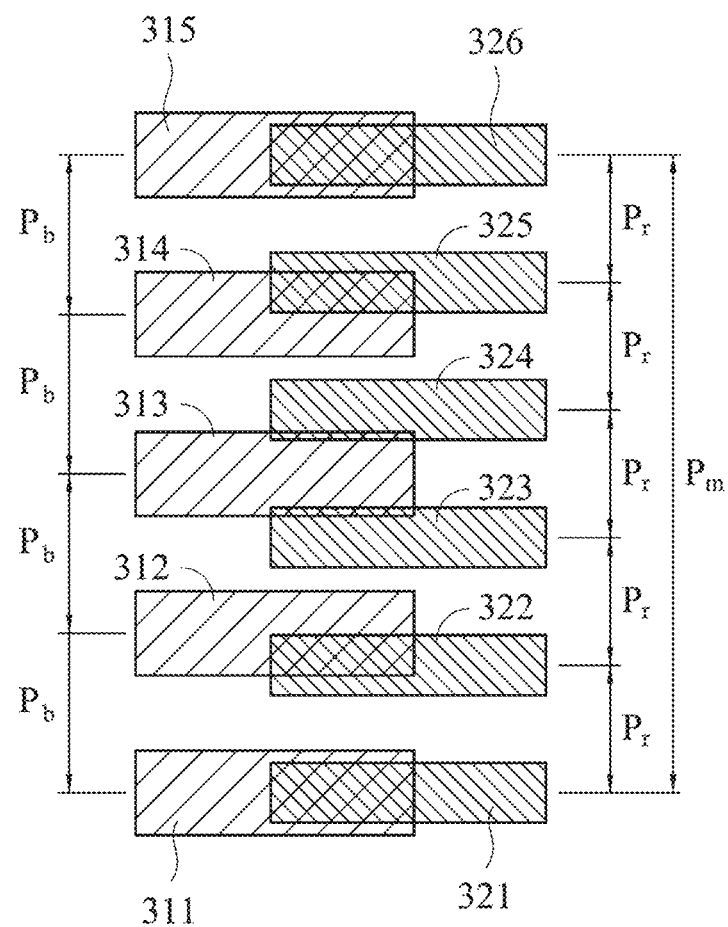

The moiré pattern is described herein. Referring to FIG. 4A, gratings 31 and 32 respectively include opaque lines 310 and lines 320. The pitch of the lines 310 is different from that of the lines 320. When the grating 31 is overlapped with the grating 32, a wider opaque area (also referred to as a dark area) 330 is generated. The dark area 330 shows up periodically for every certain distance, and therefore the moiré pattern (also referred to as moiré stripes) is formed. In more detail, referring to FIG. 4B, the lines 311-315 have a pitch $P_b$, the line 321-326 have a pitch $P_r$. The pitch $P_b$ is greater than the pitch $P_r$. The line 311 is aligned and overlapped with the line 321, the line 312 is slightly shifted from the line 322, the line 313 is partially overlapped with the lines 323 and 324 that forms the wider opaque area (i.e. the dark area 330 of FIG. 4A). In addition, the line 314 is shifted from the line 325, the line 315 is aligned and overlapped with the line 326. As shown in FIG. 4A, the dark area 330 periodically shows up. A pitch $P_m$ is the pitch of the moiré pattern and is referred to a moiré pitch. Note that there are five lines 311-315 and six lines 321-326 within the pitch $P_m$. In other words, the difference between the numbers of the two type of the lines is equal to 1. Therefore, the moiré pitch $P_m$ would satisfy the following equation (11).

$$\left| \frac{P_m}{P_b} - \frac{P_m}{P_r} \right| = 1 \tag{11}$$

Figure 5:
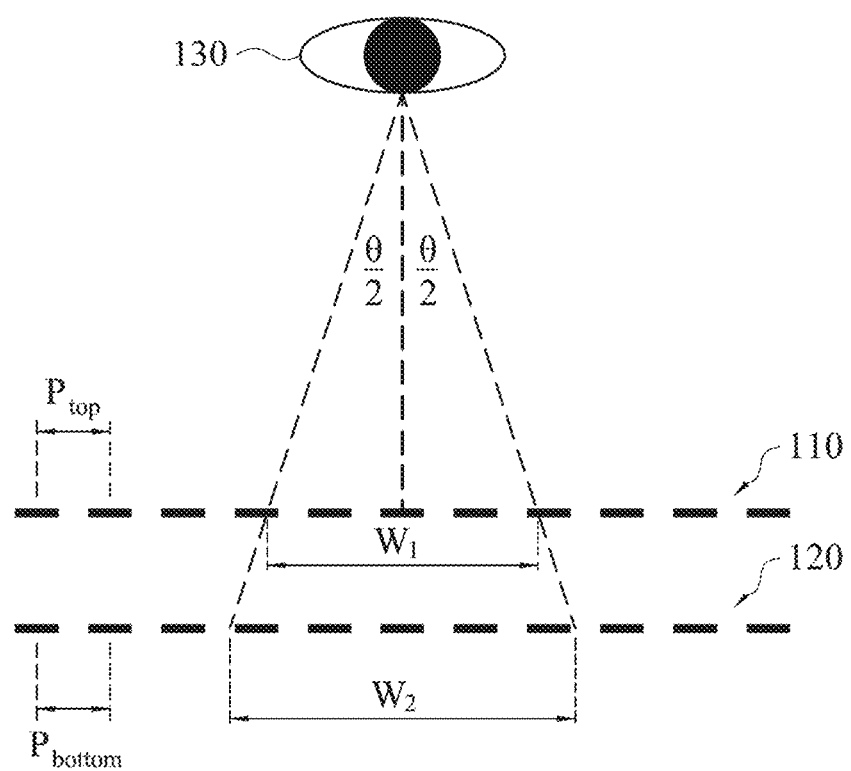
FIG. 5 is a schematic view for calculating moiré pitch in accordance with an embodiment.

FIG. 5 is a schematic view for calculating moiré pitch in accordance with an embodiment. Referring to FIG. 5, if the angle that the user 130 sees two moiré lines is θ, then the user 130 sees the width on the display panel 110 as $w_1$=2× tan θ/2×(L'+d'$_1$+d'$_2$), and the user 130 sees the width on the display panel 120 as $w_2$=2×tan θ/2×(L'+d'$_1$+d'$_2$+d'$_3$+d'$_4$+K'+ d'$_5$+d'$_6$). Therefore, in the range of angle θ, the user 130 sees $w_1/P_{top}$ pixel structures on the display panel 110 and sees $w_2/P_{bottom}$ pixel structures on the display panel 120. According to the aforementioned discussion, the criteria for forming moiré lines is to satisfy the following equation (12).

$$\left| m \times \frac{w_1}{P_{top}} - n \times \frac{w_2}{P_{bottom}} \right| = 1 \tag{12}$$

Because a periodical function can be represented as a Fourier series in terms of frequency, integers m and n are added into the equation (12) for describing the moiré pattern more completely, where m and n denote different order harmonic wave of the pixel pitch $P_{top}$ and pixel pitch $P_{bottom}$ respectively.

The angle θ is greater than 0 and tan θ/2 is positive. Therefore, after substituting $w_1$ and $w_2$ into the equation (12), the equation (12) can be rewritten as the following equations (13) and (14). The moiré line would be seen on the display panel 110, and hence the pitch Pitch$_{moire}$ of the moiré line can be represented by the following equation (15).

$$\tan\frac{\theta}{2} \times (|2 \times (L' + d'_1 + d'_2 + d'_3 + d'_4 + K' + d'_5 + d'_6) \times n \times P_{top} - \tag{13}$$
$$2 \times (L' + d'_1 + d'_2) \times m \times P_{bottom}|) = P_{top} \times P_{bottom}$$

$$\theta = 2 \times \tan^{-1}\left( \frac{\frac{1}{2}}{\left| \frac{n \times \begin{pmatrix} L' + d'_1 + d'_2 + d'_3 + \\ d'_4 + K' + d'_5 + d'_6 \end{pmatrix}}{P_{bottom}} - \frac{m \times (L' + d'_1 + d'_2)}{P_{top}} \right|} \right) \tag{14}$$

$$Pitch_{moire} = \left( \frac{L' + d'_1 + d'_2}{\left| \frac{n \times \begin{pmatrix} L' + d'_1 + d'_2 + d'_3 + \\ d'_4 + K' + d'_5 + d'_6 \end{pmatrix}}{P_{bottom}} - \frac{m \times (L' + d'_1 + d'_2)}{P_{top}} \right|} \right) \tag{15}$$

In general, when the moiré pitch Pitch$_{moire}$ is less than 500 micrometers (μm), the user 130 may not be able to identify two moiré lines. That is, when the moiré pitch Pitch$_{moire}$ is less than 500 μm, the user would not see the moiré pattern of the display device 100.

As shown in the equation (15), m=1 corresponds to the fundamental wave of the pixel pitch $P_{top}$.

If $\dfrac{n \times (L' + d'_1 + d'_2 + d'_3 + d'_4 + K' + d'_5 + d'_6)}{P_{bottom}}$ is close to $$\frac{(L' + d'_1 + d'_2)}{P_{top}},$$

then the moiré pitch Pitch$_{moire}$ becomes larger. That is, when the pixel pitch $P_{bottom}$ is close to $$n \times \frac{(L' + d'_1 + d'_2 + d'_3 + d'_4 + K' + d'_5 + d'_6)}{(L' + d'_1 + d'_2)} \times P_{top},$$

the moiré pitch Pitch$_{moire}$ gets larger. Similarly, m=2 corresponds to the second harmonic wave of the pixel pitch $P_{top}$, and the moiré pitch Pitch$_{moire}$ gets larger when the pixel pitch $P_{bottom}$ is close to $$\frac{1}{2} \times n \times \frac{(L' + d'_1 + d'_2 + d'_3 + d'_4 + K' + d'_5 + d'_6)}{(L' + d'_1 + d'_2)} \times P_{top}.$$

In addition, m=3 or m=4 corresponds to the third harmonic wave or the fourth harmonic wave of the pixel pitch $P_{top}$, and the moiré pitch Pitch$_{moire}$ gets larger when the pixel pitch $P_{bottom}$ is close to $$\frac{1}{3} \times n \times \frac{(L' + d'_1 + d'_2 + d'_3 + d'_4 + K' + d'_5 + d'_6)}{(L' + d'_1 + d'_2)} \times P_{top} \text{ or}$$

$$\frac{1}{4} \times n \times \frac{(L' + d'_1 + d'_2 + d'_3 + d'_4 + K' + d'_5 + d'_6)}{(L' + d'_1 + d'_2)} \times P_{top}.$$

Therefore, the moiré pitch $Pitch_{moire}$ generated by the display device 100 can be controlled to be less than 500 μm by adjusting some parameters (e.g. K', $d'_i$, $P_{top}$ and $P_{bottom}$) so that the user would not see the moiré pattern.

On the other hand, each set of (m,n) corresponds to a moiré pattern. In general, when $P_{top}/P_{bottom}$ is close to m/n, this set of (m,n) corresponds to a larger moiré pitch. It should be appreciated that the number of the combinations (m,n) are infinite, and therefore it is impossible to substitute all (m,n) into the equation (15) to calculate all corresponding moiré pitches $Pitch_{moire}$. As described above, a general periodical function is represented as a Fourier series in terms of frequency, and the amplitude of the function at a particular frequency is decreased as the frequency is increased. In the invention, as m and n are increasing, the corresponding moiré pattern would be generated by higher order harmonic waves of the pixel pitch $P_{top}$ of the first pixel structure 115 and the pixel pitch $P_{bottom}$ of the second pixel structure 125.

Therefore, when m and n are increased, the intensity of the corresponding moiré pattern would be significantly decreased and the vision affection is also reduced. Accordingly, the moiré patterns corresponding to a range m+n≤9 are generally considered, and the moiré pattern for m+n>10 are ignored. In other words, the moiré pitch $Pitch_{moire}$ is calculated for every set of (m,n) while m+n≤9. If all moiré pitches $Pitch_{moire}$ of (m,n) in the range of m+n≤9 are less than 500 μm, then the user would not see the moiré pattern; if at least one set (m,n) in the range of m+n≤9 has the moiré pitch $Pitch_{moire}$ larger or equal to 500 μm, then the user would see the moiré pattern and thus the parameters (e.g. K', $d'_i$, $P_{top}$ and $P_{bottom}$) of the display device 100 should be adjusted to reduce the moiré pitch $Pitch_{moire}$. However, the invention is not limited thereto. In some other embodiments, more or fewer sets of (m,n) may be tested, and the invention does not intend to limit how many sets of (m,n) are tested. Note that (m,n)=(1,1) corresponds to the fundamental wave of the pixel pitch $P_{top}$ and the pixel pitch $P_{bottom}$, and the intensity of the corresponding moiré pattern is larger than that of other sets (m,n). Therefore, no matter how many sets (m,n) are tested, (m,n)=(1,1) should be included.

Accordingly, when calculating the moiré pitch $Pitch_{moire}$ by using the equation (15), some parameters (e.g. L', K', $d'_i$, $P_{top}$ and $P_{bottom}$) are given, and the moiré pitch $Pitch_{moire}$ of each set (m,n) in the range of m+n≤9 is calculated. A maximum value $Pitch_{moire\_max}$ among the calculated moiré pitches $Pitch_{moire}$ is obtained. If $Pitch_{moire\_max}$ is less than 500 μm, then the user would not see the moiré pattern, that is, the display device manufactured by the parameters would not generate the moiré pattern which is capable of being seen by the user. If $Pitch_{moire\_max}$ is larger or equal to 500 μm, then the user would see the moiré pattern, and therefore the parameters of the display device 100 should be readjusted. As described above, more or fewer sets of (m,n) may be tested, and the invention does not intend to limit how many sets of (m,n) are tested, as long as the set (m,n)=(1,1) is included.

As mentioned above, in some embodiments, the display device 100 may only include three polarizers (i.e. the polarizers 111, 114 and 124 but not including the polarizer 121, or including the polarizers 111, 121 and 124 but not including the polarizer 114). Therefore, when calculating the pitch $Pitch_{moire}$ of the moiré lines using the equation (15), $d'_4$ or $d'_5$ may be set to 0. In addition, in other embodiments, the display device 100 may only include two polarizers (i.e. the polarizers 111 and 124 but not including the polarizer 114 and 121). Therefore, when calculating the pitch $Pitch_{moire}$ of the moiré lines using the equation (15), $d'_4$ and $d'_5$ may be set to 0.

Note that in some embodiments, a liquid crystal layer and an alignment layer are disposed between the TFT array substrate (e.g. the second substrate 113 or/and the fourth substrate 123) and the CF substrate (e.g. the first substrate 112 or/and the third substrate 122). The liquid crystal layer and the alignment layer may be omitted from the equations because the thicknesses of the liquid crystal layer and the alignment layer are much smaller than the viewing distance L, the distance between the panels K, and the thickness $d_i$ of the substrate/polarizer.

The equations (14) and (15) may be further simplified. In detail, the effective viewing distance L' is generally much larger than the effective thicknesses $d'_1 \ldots d'_6$, and the effective distance between the panels K' is also generally much larger than the effective thicknesses $d'_1 \ldots d'_6$. Therefore, the equations (14) and (15) may be simplified as the following equations (16) and (17). In some embodiments, the equations (16) and (17) are used instead of the equation (14) and (15).

$$\theta = 2 \times \tan^{-1}\left(\frac{\frac{1}{2}}{\left|\frac{n \times \left(\frac{L}{n_L} + \frac{K}{n_K}\right)}{P_{bottom}} - \frac{m \times \left(\frac{L}{n_L}\right)}{P_{top}}\right|}\right) \quad (16)$$

$$Pitch_{moire} = \frac{L'}{\left|\frac{n \times \left(\frac{L}{n_L} + \frac{K}{n_K}\right)}{P_{bottom}} - \frac{m \times \left(\frac{L}{n_L}\right)}{P_{top}}\right|} \quad (17)$$

The equation (17) can be rewritten as the following equation (18).

$$Pitch_{moire} = \frac{P_{top}}{\left|\left(n \times \left(\frac{P_{top}}{P_{bottom}}\right) - m\right) + \left(n \times \frac{n_L}{n_K} \times \frac{K}{n_K} \times \frac{P_{top}}{P_{bottom}}\right)\right|} = \frac{P_{top}}{\left|\left(n \times \left(\frac{P_{top}}{P_{bottom}}\right) - m\right) + \left(n \times \frac{K'}{L'} \times \frac{P_{top}}{P_{bottom}}\right)\right|}. \quad (18)$$

As shown in the equation (18), the pitch $Pitch_{moire}$ of the moiré lines is mainly decided by the pixel pitch $P_{top}$, the ratio $P_{top}/P_{bottom}$, the ratio $$\left(\frac{n_L}{L} \times \frac{K}{n_K}\right)$$

of the effective distance between the panels K'=K/$n_k$ to the effective viewing distance L'=L/$n_L$. Experimental results are provided below to describe how to decide the pixel pitch $P_{top}$, the pixel pitch $P_{bottom}$ and the distance between the panels K.

The effective viewing distance L' is generally in a range from 500 mm to 1500 mm, and the effective distance between the panels K' is generally in a range from 0 mm to 50 mm. In the following FIG. 6A-6D, the largest or smallest effective viewing distance L' is picked with the largest or smallest effective distance K', and the pixel pitch $P_{top}$ and the pixel pitch $P_{bottom}$ are taken as variables to calculate corresponding moiré pitch $\text{Pitch}_{moire}$ in order to find the combination of $P_{top}$ and $P_{bottom}$ that the user would not see the moiré pattern while the effective viewing distance L' is in the range from 500 mm to 1500 mm, and the effective distance between the panels K' is in the range from 0 mm to 50 mm.

In addition, in the embodiments of FIG. 6A-6D, the display device 100 includes only two polarizers (i.e. the first polarizer 111 and second polarizer 124 but not including the third polarizer 114 and the fourth polarizer 121). Therefore, when calculating the moiré pitch $\text{Pitch}_{moire}$ based on the equation (15), the thickness $d_4$ of the third polarizer 114 and the thickness $d_5$ of the fourth polarizer 121 are set to 0.

Referring to FIG. 2 and FIG. 6A-6D, in the embodiments of FIG. 6A-6D, the thickness $d_1$ of the polarizer 111 is 0.135 mm; the thickness $d_2$ of the substrate 112 is 0.4 mm; the thickness $d_3$ of the substrate 113 is 0.4 mm; the thickness $d_4$ of the polarizer 114 is 0 mm (no third polarizer 114 is disposed); the thickness $d_5$ of the polarizer 121 is 0 mm (no fourth polarizer 121 is disposed); the thickness $d_6$ of the substrate 122 is 0.2 mm; the thickness $d_7$ of the substrate 123 is 0.2 mm; the thickness $d_8$ of the polarizer 124 is 0.135 mm. The refractive indexes of the polarizers 111, 124 and the substrates 112, 113, 122, 123 are 1.5. The effective viewing distances L' are 500 mm, 1500 mm, 500 mm and 1500 mm respectively in the embodiments of FIG. 6A-6D. The effective distances between the panels K' are 0 mm, 0 mm, 50 mm and 50 mm respectively in the embodiments of FIG. 6A-6D. After the parameters are given, the pixel pitch $P_{top}$ and the pixel pitch $P_{bottom}$ are taken as variables to build the tables in FIG. 6A-6D. To be specific, in the tables of FIG. 6A-6D, the first row is the pixel pitch $P_{top}$ in a range from 20 μm to 80 μm; the first column is the pixel pitch $P_{bottom}$ in a range from 20 μm to 80 μm; the other numbers are the moiré pitches $\text{Pitch}_{moire}$ with unit of mm. As mentioned above, the range m+n≤9 is picked when using the equation (15) to calculate the moiré pitch $\text{Pitch}_{moire}$. Each moiré pitch $\text{Pitch}_{moire}$ in the tables of FIG. 6A-6D is the maximum value among the moiré pitches $\text{Pitch}_{moire}$ in the range of m+n≤9. If the pitch $\text{Pitch}_{moire}$ is larger than or equal to 0.5 mm (i.e. 500 μm), the number will be highlighted by gray background to indicate that the corresponding pixel pitch $P_{top}$ and pixel pitch $P_{bottom}$ should not be adopted. For example, in FIG. 6A, when the pixel pitch $P_{top}$ and the pixel pitch $P_{bottom}$ are both 20 μm, the moiré pitch $\text{Pitch}_{moire}$ is 25.02 mm which is so large that the user can identify the two moiré lines. Therefore, the combination should not be adopted.

Figure 6A:
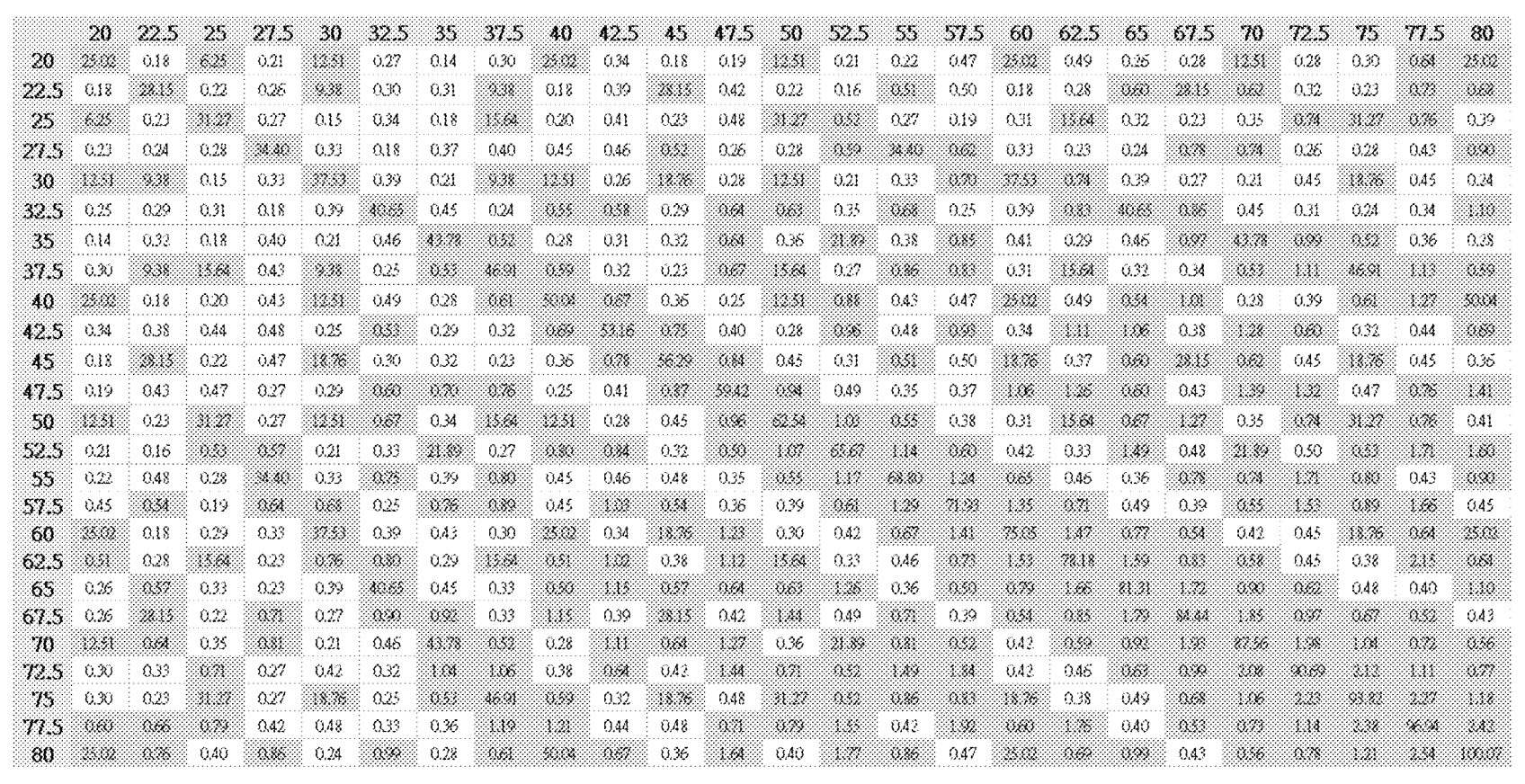
Figure 6B:
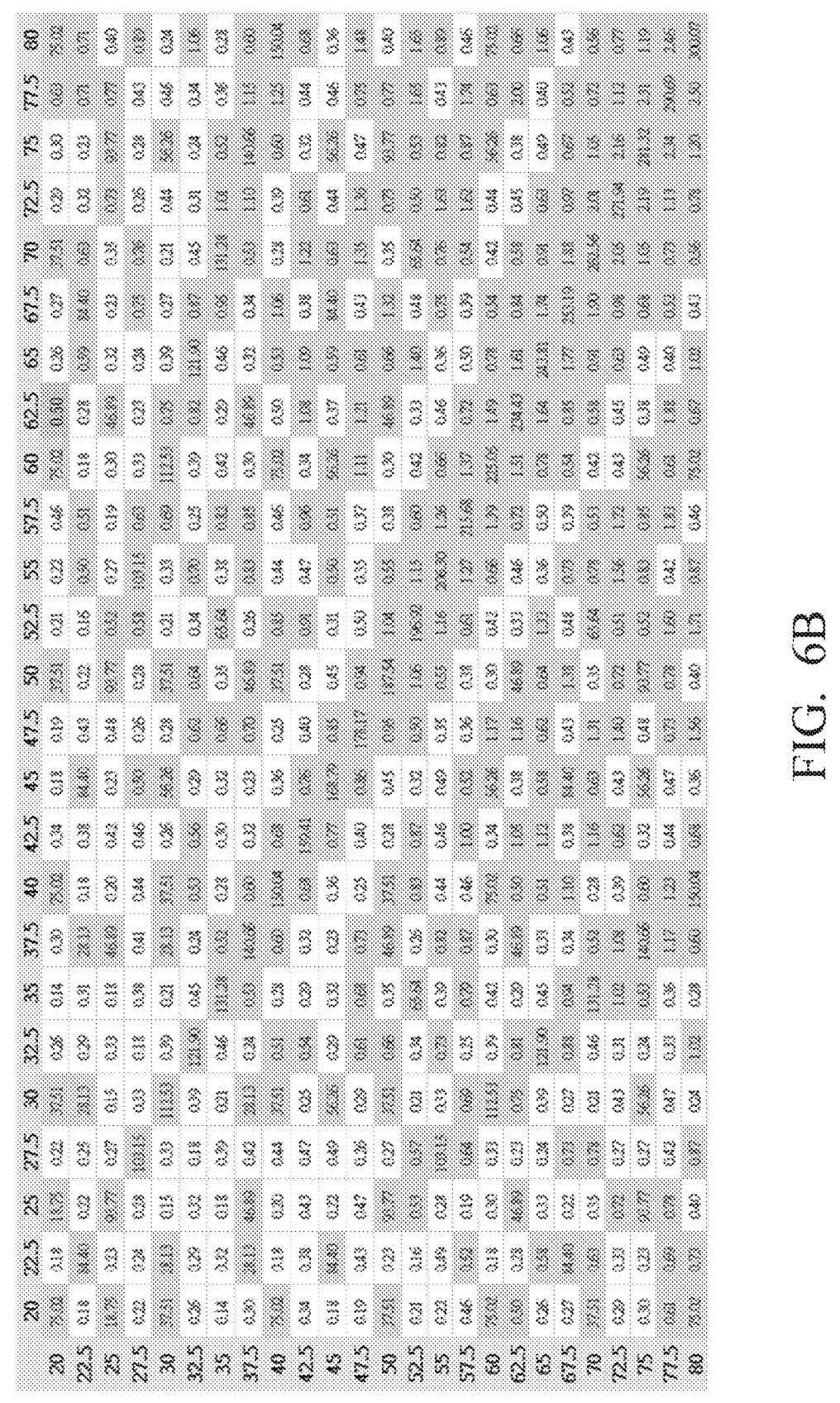
Figure 6C:
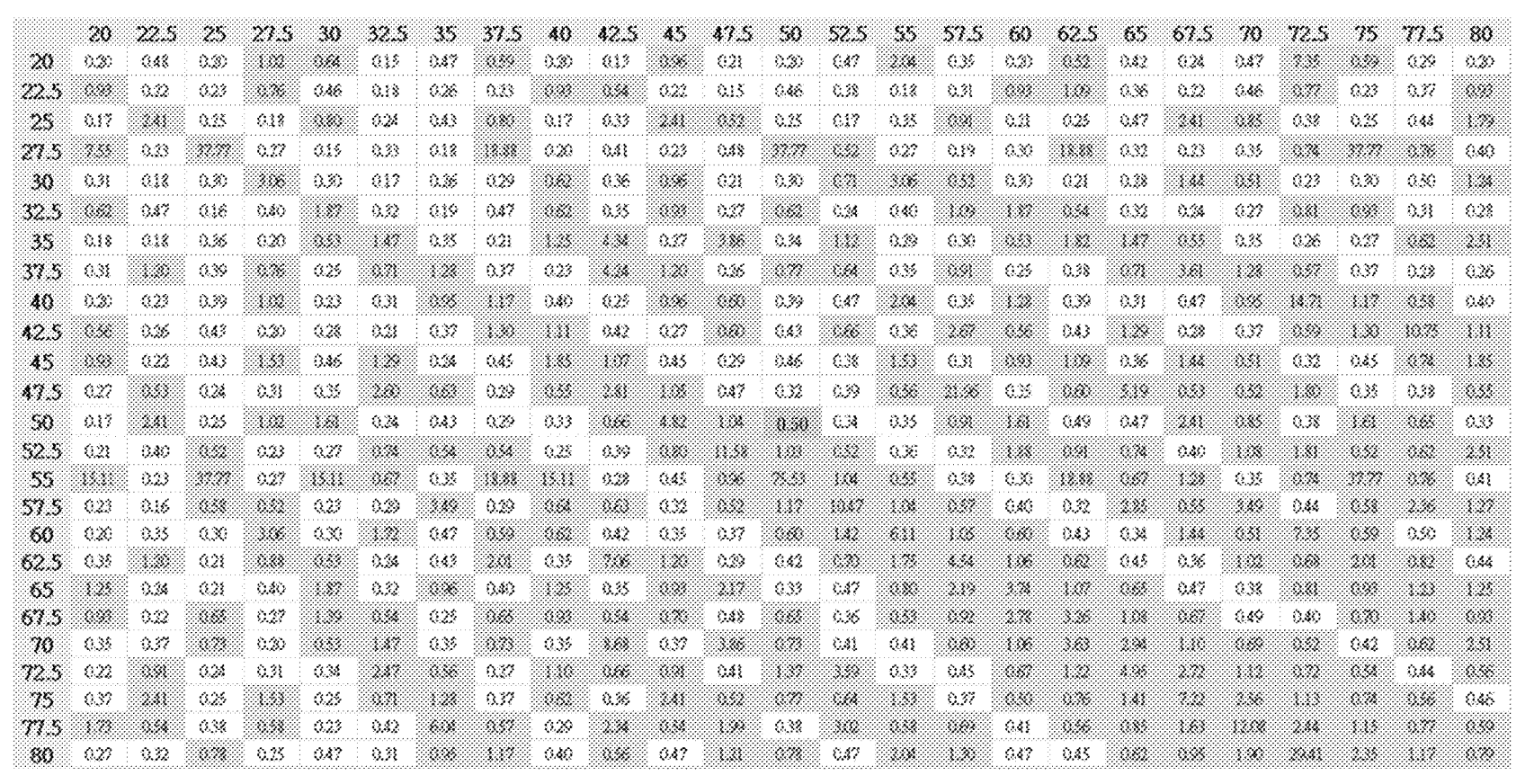
Figure 6D:
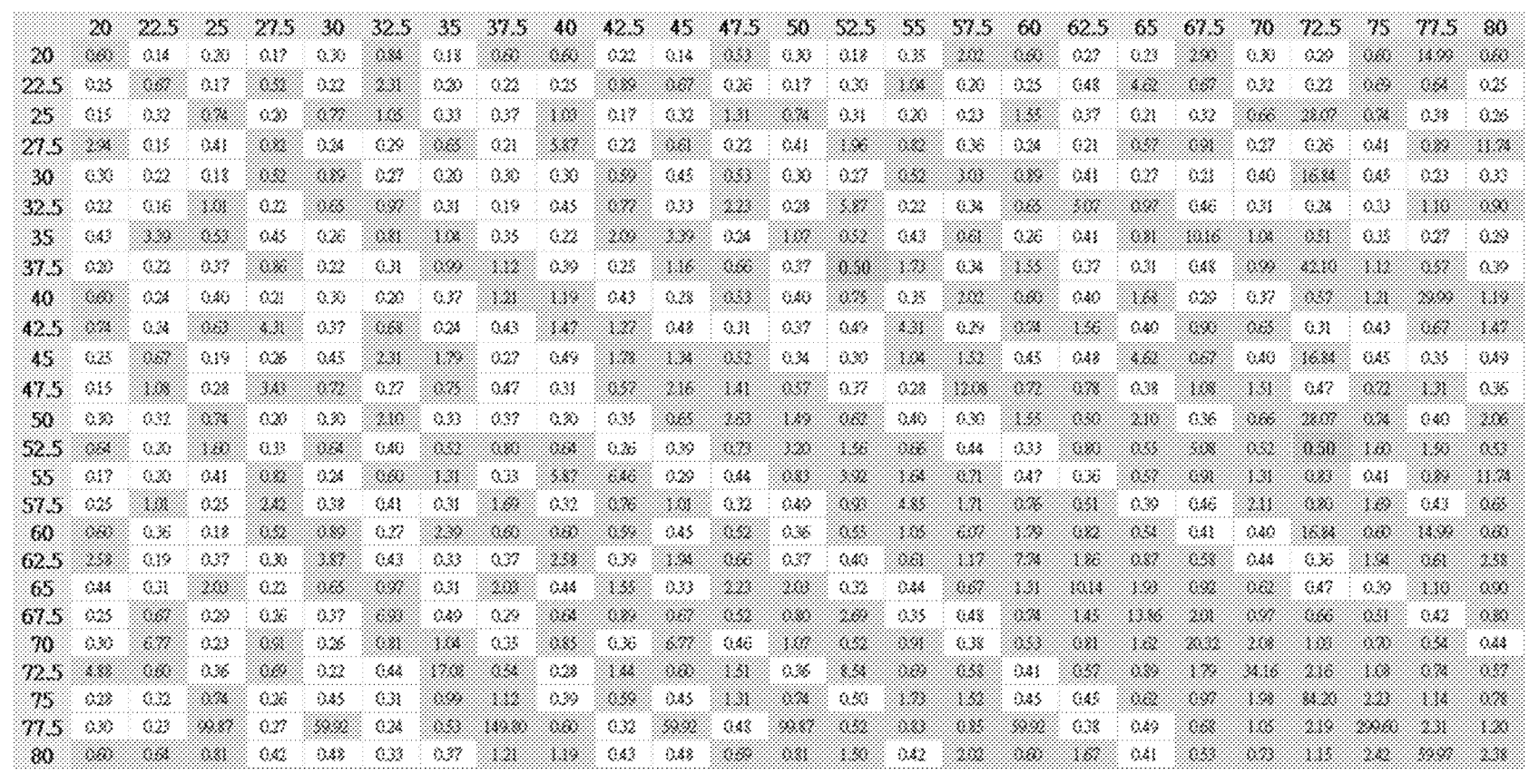

The effective distance K' is 0 mm in FIGS. 6A and 6B. The effective viewing distances L' are 500 mm and 1500 mm respectively in FIGS. 6A and 6B. As shown in FIGS. 6A and 6B, when the pixel pitch $P_{top}$ of the pixel structure 115 on the first display panel 110 is equal to the pixel pitch $P_{bottom}$ of the pixel structure 125 on the second display panel 120, the moiré pitch $\text{Pitch}_{moire}$ is greater than 500 μm and increased along with increasing of the pixel pitch $P_{top}$ and $P_{bottom}$. In FIGS. 6C and 6D, the effective distances between the panels K' are 50 mm, and the viewing distances L' are 500 mm and 1500 mm respectively. As shown in FIG. 6C, when the pixel pitch $P_{top}$ of the pixel structure 115 on the first display panel 110 is equal to the pixel pitch $P_{bottom}$ of the pixel structure 125 on the second display panel 120 and larger than 50 μm, the moiré pitch $\text{Pitch}_{moire}$ is greater than 500 μm and increased along with increasing of pixel pitch $P_{top}$ and $P_{bottom}$. As shown in 6D, when the pixel pitch $P_{top}$ of the pixel structure 115 on the first display panel 110 is equal to the pixel pitch $P_{bottom}$ of the pixel structure 125 on the second display panel 120, the moiré pitch $\text{Pitch}_{moire}$ is greater than 500 μm and increased along with increasing of pixel pitch $P_{top}$ and $P_{bottom}$. In summary, it is preferable to set the pixel pitch $P_{top}$ of the pixel structure 115 on the first display panel 110 to be different from the pixel pitch $P_{bottom}$ of the pixel structure 125 on the second display panel 120 to prevent the user from seeing the moiré pattern. In other words, the resolution of the first display panel 110 would be different from that of the second display panel 120.

In addition, as shown in FIG. 6A-6D, when the pixel pitch $P_{top}$ is not equal to the pixel pitch $P_{bottom}$, in some conditions, the pitch $\text{Pitch}_{moire}$ of the moiré lines is also greater than or equal to 500 μm. The present invention can use two display panels with different resolutions, and uses the equation (15) or (17) to calculate the moiré pitch $\text{Pitch}_{moire}$ based on a predetermined range of effective viewing distance L' and/or a predetermined effective distance K' by different pixel pitch $P_{top}$ and pixel pitch $P_{bottom}$ so as to determine the best combination of pixel pitch $P_{top}$ and pixel pitch $P_{bottom}$.

For example, when the display device 100 is car screen, the predetermined effective viewing distance L' is approximately in a range from 500 mm to 1500 mm. Therefore, the equation (15) or the equation (17) is used to calculate multiple moiré pitches $\text{Pitch}_{moire}$ of different sets of pixel pitch $P_{top}$ and pixel pitch $P_{bottom}$ based on the predetermined range of effective viewing distance L' and different effective distance between the panels K', and thus to decide the best combination of pixel pitch $P_{top}$ and pixel pitch $P_{bottom}$, and also decide the effective distance between the panels K' between panels.

That is, the way for bonding the two panels, material and thickness of the adhesive can be decided. Moreover, in other embodiments, the range of effective viewing distance L' the effective distance between the panels K' (i.e. the way for bonding the two panels, material and thickness of the adhesive) can be predetermined, and then the equation (15) or (17) is used to calculate multiple moiré pitches $\text{Pitch}_{moire}$ of different sets of pixel pitch $P_{top}$ and pixel pitch $P_{bottom}$ based on the predetermined range of effective viewing distance L' and the predetermined effective distance K' in order to decide the best combination of pixel pitch $P_{top}$ and pixel pitch $P_{bottom}$. For example, when the display device 100 is a car screen, the effective viewing distance L' is approximately in a range from 500 mm to 1500 mm, the way for bonding the two panels is predetermined to be edge lamination, the effective distance between the panels K' is 6 mm, the equation (15) or (17) is used to calculate multiple moiré pitches $\text{Pitch}_{moire}$ of different sets of pixel pitch $P_{top}$ and pixel pitch $P_{bottom}$ based on the predetermined range of effective viewing distance L' in order to decide the best combination of pixel pitch $P_{top}$ and pixel pitch $P_{bottom}$.

In addition, the first display panel 110 generally shown images of the main object, and the second display panel 120 shows images of a background. Alternatively, when the display device 100 is a dashboard of a vehicle, the first display panel 110 generally shown an indicator, and the second display panel 120 shows scales. The indicator needs to slightly move between the scales according to the car situation. Therefore, when two display panels with different resolutions are used to prevent the moiré pattern from being seen by the user, it is preferable to set the resolution of the first display panel 110 larger than that of the second display panel 120. That is, the pixel pitch $P_{top}$ of the pixel structures 115 on the first display panel 110 is smaller than the pixel pitch $P_{bottom}$ of the pixel structures 125 on the second display panel 120.

As mentioned above, the distance between the images on the display panel 110 and the user 130 is shorter than that between the images on the display panel 120 and the user 130 so that the user 130 can see the 3D image. In general, the larger the effective distance between the panels K' is, the better the 3D vision effect of the display device 100 is. However, the effective distance between the panels IC cannot be too large because the display panel 110 is bonded to the display panel 120 generally through an adhesive layer. Herein, the effective viewing distance is predetermined to be in a range from about 500 mm to 1500 mm, the pixel pitch $P_{top}$ of the pixel structures 115 on the first display panel 110 is in a range from 32 μm to 45 μm, and the pixel pitch $P_{bottom}$ of the pixel structures 125 on the second display panel 120 is in a range from 32 μm to 46 μm in order to find out an appropriate effective distance between the panels K' to make the moiré pitch $Pitch_{moire}$ less than 500 μm.

Referring to FIG. 2 and FIG. 7A-7D, in the embodiments of FIG. 7A-7D, the thickness $d_1$ is 0.135 mm; the thickness $d_2$ is 0.4 mm; the thickness $d_3$ is 0.4 mm; the thickness $d_4$ is 0 mm; the thickness $d_5$ is 0 mm; the thickness $d_6$ is 0.2 mm; the thickness $d_7$ is 0.2 mm; the thickness $d_8$ is 0.135 mm. In the embodiments of FIG. 7A-7D, the pixel pitches $P_{top}$ are respectively 38 μm, 38 μm, 32 μm and 45 μm, and the pixel pitches $P_{bottom}$ are respectively 32 μm, 46 μm, 38 μm and 38 μm. In the tables, the first row is the effective viewing distance L' which is x mm in a range from 500 to 1500; the first column is the effective distance between the panels K' which is y mm in a range from 0 to 50; the other numbers are moiré pitches $Pitch_{moire}$ with unit of mm. In the embodiments of FIG. 7A and FIG. 7D, when the variable y is in the range from 0 to 15 and the variable x is in the range from 500 to 1500, the corresponding moiré pitches $Pitch_{moire}$ are all less than 0.5 mm. In the embodiments of FIG. 7B and FIG. 7C, all set of (x,y) would not generate moiré pitch $Pitch_{moire}$ greater than 0.5 mm. In addition, as shown in FIGS. 7A, 7C, and 7D, the effective distance between the panels K' is preferably set in a range from 0 to 10 mm so that the moiré pitches $Pitch_{moire}$ to which different viewing distances L' correspond would be uniform.

As shown in FIG. 7A-7D, the effective distance between the panels K' is preferably in the range from 0 to 15 mm to prevent the moiré pattern from being seen by the user at the effective viewing distance which is in the range from 500 to 1500 mm. Moreover, the effective distance between the panels K' may be further set in the range from 0 to 10 mm so that the moiré pitches $Pitch_{moire}$ to which different effective viewing distances L' correspond would be uniform. Note that when the effective distance between the panels K' is 0 mm (i.e. the display panel 110 is in direct contact with the display panel 120), the 3D vision effect is bad because the difference between the distance from the display panel 110 to the user 130 and the distance from the display panel 120 to the user is small. Therefore, the effective distance between the panels K' is preferably in a range from 5 to 10 mm so that the user would not see the moiré pattern and the 3D vision effect is better. For example, when the display panel 110 is bonded to the display panel 120 by edge lamination, the distance K may be essentially set as 6 mm. The effective distance between the panels K' is 6 mm because the medium in the gap between the display panel 110 and the display panel 120 is air, whose refractive index is 1, when the edge lamination approach is applied.

Figure 8A:
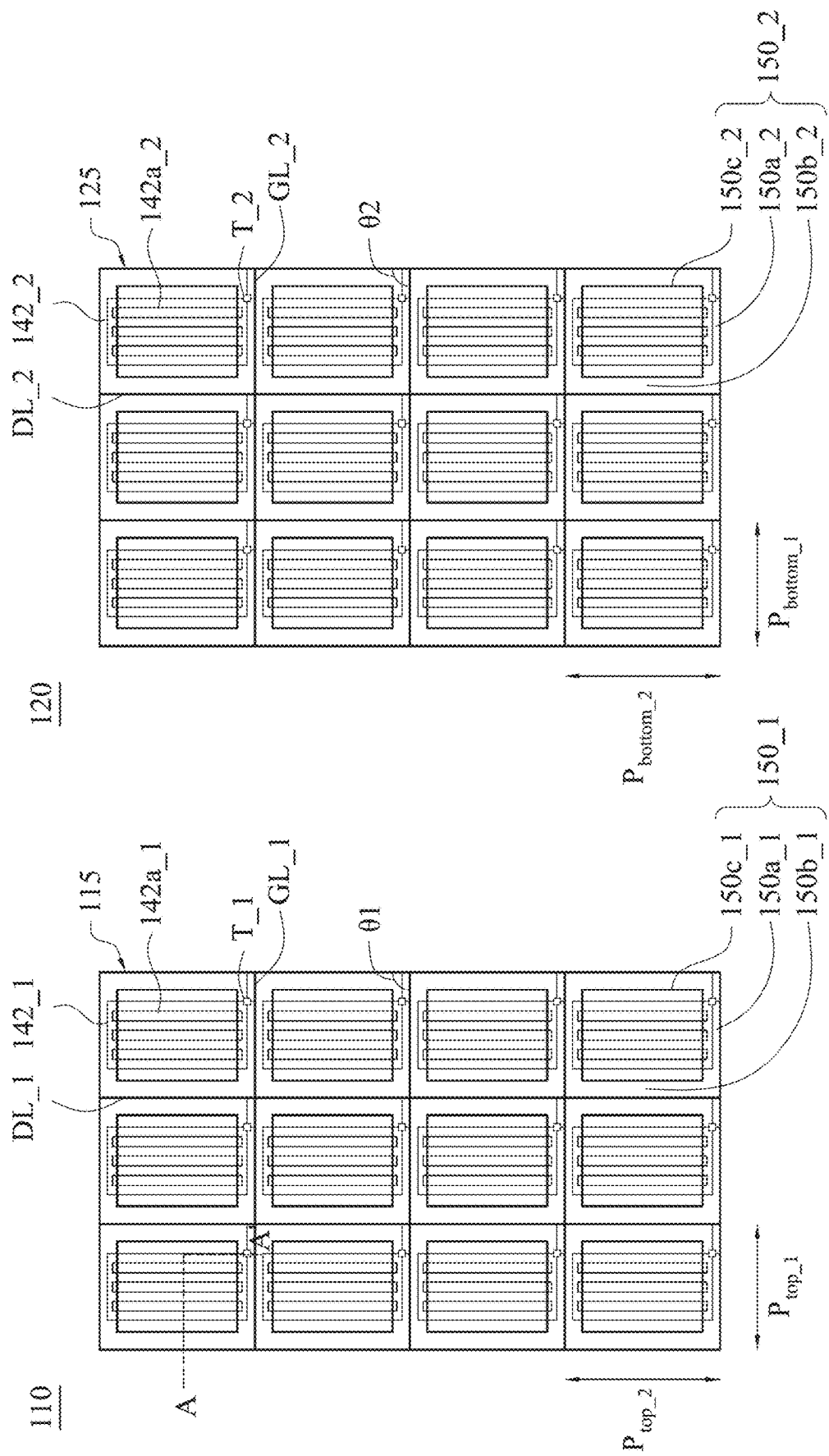
FIG. 8A is a schematic diagram illustrating a pixel structure 115 of a first display panel 110 and a pixel structure 125 of a second display panel 120 in accordance with an embodiment.
Figure 8B:
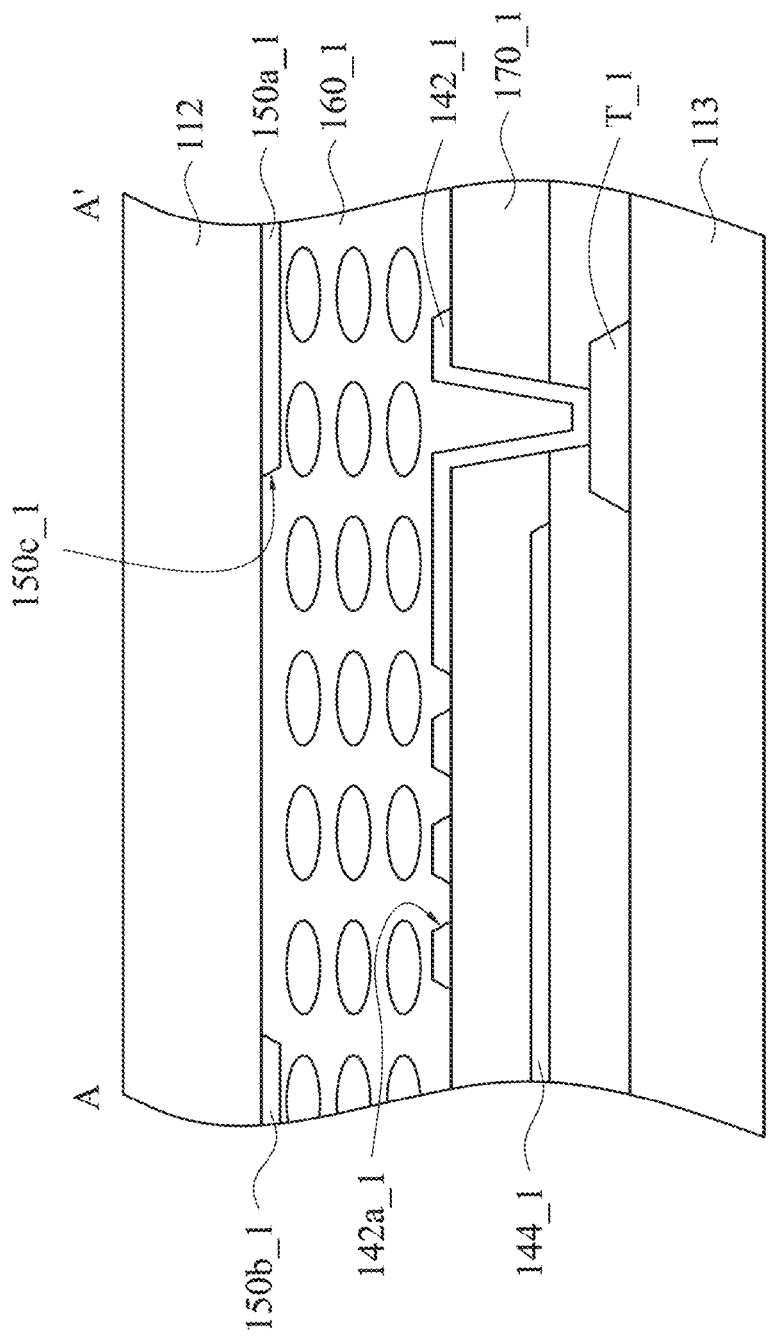
FIG. 8B is a cross-sectional view corresponding to a cross-sectional line AA' of FIG. 8A.

FIG. 8A is a schematic diagram illustrating a pixel structure 115 of the first display panel 110 and a pixel structure 125 of the second display panel 120 in accordance with an embodiment. FIG. 8B is a cross-sectional view corresponding to a cross-sectional line AA' of FIG. 8A. The pixel structure 115 includes TFT T_1, a first signal line GL_1, a second signal line DL_1 and a pixel electrode 142_1 electrically connected to the TFT T_1. One of the first signal line GL_1 and the second signal line DL_1 is a gate line, and the other one of the first signal line GL_1 and the second signal line DL_1 is a data line. The extending direction of the first signal line GL_1 is different from that of the second signal line DL_1. In the embodiment, the first signal line GL_1 and the second signal line DL_1 are both straight. An angle θ1 is formed between a projection of the first signal line GL_1 onto the substrate 113 and a projection of the second signal line DL_1 onto the substrate 113. The angle θ1 is selective 90°. However, the invention is not limited thereto. In other embodiments, the extending directions of the first signal line GL_1 and the second signal line DL_1, and the angle θ1 between the first signal line GL_1 and the second signal line DL_1 may be appropriately modified according to practice requirement. For example, the angle θ1 may be 83° or 97° in other embodiments. In addition, in some embodiments, the first signal line GL_1 and/or the second signal line DL_1 may be polylines in the pixel structures.

Each pixel structure 115 further includes a common electrode 144_1 (not shown in FIG. 8A, please referring to FIG. 8B) overlapped with the pixel electrode 142_1. In the embodiment, the pixel electrode 142_1 and the common electrode 144_1 are selectively disposed on the same substrate (i.e. the substrate 113). An insulation layer 170_1 is disposed between the pixel electrode 142_1 and the common electrode 144_1. In the embodiment, the pixel electrode 142_1 is disposed above the common electrode 144_1 and has multiple slits 142a_1 to expose the common electrode 144_1. However, the invention is not limited thereto. In other embodiments, the pixel electrode 142_1 may be disposed beneath the common electrode 144_1, and the common electrode 144_1 may have slits to expose the pixel electrode 142_1. The display panel 110 is in the FFS mode in the embodiment. However, the invention is not limited thereto. In another embodiment, if the pixel electrode 142_1 and the common electrode 144_1 are disposed on the same substrate (i.e. the substrate 113), then the display panel 110 may be in the IPS mode or another suitable mode. In another embodiment, the pixel electrode 142_1 and the common electrode 144_1 may be disposed on the substrate 113 and the substrate 112 respectively, and the first display panel 110 may be in the TN mode, VA mode, OCB mode or other suitable modes.

In the embodiments, a light shielding layer 150_1 is selectively disposed on the substrate 112. The light shielding layer 150_1 is often called a black matrix layer. In addition, the invention does not intend to limit whether the light shielding layer 150_1 has to be disposed on the substrate 112. In other embodiments, the light shielding layer 150_1 and a color filter layer (not shown) may be selectively disposed on the same substrate (i.e. the substrate 113) with the TFT T_1 and the pixel electrode 142_1, and thus the COA structure is formed. The light shielding layer 150_1 covers at least one of the first signal line GL_1, the second signal line DL_1 and the TFT T_1 of each pixel structure 115. For example, in the embodiment, the light shielding layer 150_1 may cover the first signal line GL_1, the second signal line DL_1 and the TFT T_1 in each pixel structure 115. In detail, the light shielding layer 150_1 has a mesh pattern which is formed by the intersection of multiple line segments 150a_1 and line segments 150b_1. The line segments 150a_1 of the mesh pattern can cover the first signal line GL_1 and the TFT T_1. The line segments 150b_1 of the mesh pattern can cover the second signal line DL_1. However, the invention is not limited thereto. In other embodiments, the light shielding layer 150_1 does not necessarily cover the first signal line GL_1, the second signal line DL_1 the TFT T_1 completely if the light leakage problem is alleviated by a processing or layout approach. For example, in some embodiments, the light shielding layer 150_1 may cover the TFT T_1 and the first signal line GL_1 but not cover the second signal line DL_1. Therefore, the light shielding layer 150 may include the line segments 152a_1 but not include the line segments 152b_1. In other embodiments, the light shielding layer 150_1 may cover the second signal line DL_1 but not cover the TFT T_1 and the first signal line GL_1. Therefore, the light shielding layer 150_1 may include the line segment 152b_1s but not include the line segment 152a_1. The light shielding layer 150_1 has multiple openings 150c_1. Each opening 150c_1 corresponds to one pixel structure 115. In the embodiment, the opening 150c_1 is rectangular. However, the invention is not limited thereto. In other embodiment, the opening 150c_1 may have other suitable shapes. For example, the opening 150c_1 may be non-rectangular in the embodiment that the angle θ1 between the first signal line GL_1 and the second signal line DL_1 is not equal to 90° or in the embodiment that the first signal line GL_1 and/or the second signal line DL_1 are polylines in the pixel structures.

Similarly, the pixel structure 125 of the second display panel 120 includes a TFT T_2, a first signal line GL_2, a second signal line DL_2, and a pixel electrode 142_2 electrically connected to the TFT T_2. An angle θ2 is formed between a projection of the first signal line GL_2 onto the substrate 123 and a projection of the second signal line DL_2 onto the substrate 123. Each pixel structure 125 further includes a common electrode overlapped with the pixel electrode 142_2. A light shielding layer 150_2 is formed of multiple line segments 150a_2 and line segments 150b_2 and has multiple openings 150c_2. The TFT T_2, the first signal line GL_2, the second signal line DL_2, the angle θ2, the pixel electrode 142_2, the common electrode, the light shielding layer 150_2, the line segments 150a_2, 150b_2 and the openings 150c_2 in the pixel structure 125 are similar to the TFT T_1, the first signal line GL_1, the second signal line DL_1, the angle θ1, the pixel electrode 142_1, the common electrode 144_1, the light shielding layer 150_1, the line segments 150a_1, 150b_1 and the openings 150c_1 in the pixel structure 115, and therefore the description will not be repeated.

As shown in FIG. 8A, when viewed from a direction perpendicular to the first display panel 110 and the second display panel 120, the pixel structure 115 and the pixel structure 125 are two-dimensional structures. In other words, the pixel structure 115 and the pixel structure 125 respectively have a pixel pitch $P_{top\_1}$ and a pixel $P_{bottom\_1}$ along a first direction, and respectively have a pixel pitch $P_{top\_2}$ and a pixel $P_{bottom\_2}$ along a second direction. The first direction is different from the second direction. For example, in the embodiment, the first direction is a horizontal direction, and the second direction is a vertical direction. However, the invention is not limited thereto. In other embodiments, the angle between the first direction and the second direction is not equal to 90 degrees. The light shielding layer 150_1 includes the line segments 150a_1 and 150b_1, and the light shielding layer 150_2 includes the line segments 150a_2 and 150b_2. When viewed from the direction perpendicular to the substrate 113 or 123, the extending direction of the line segments 150a_1 and 150a_2 is parallel to the extending direction of the first signal lines GL_1 and GL_2; and the extending direction of the line segments 150b_1 and 150b_2 is parallel to the extending direction of the second signal lines DL_1 and DL_2. The user may see moiré lines along a direction caused by the line segments 150a_1 and 150a_2 of the light shielding layer 150_1 and 150_2 on the first display panel 110 and the second display panel 120. The user may also see moiré lines along another direction caused by the line segments 150b_1 and 150b_2 of the light shielding layer 150_1 and 150_2 on the first display panel 110 and the second display panel 120. Therefore, the equation (15) or (17) can be used to calculates moiré pitches $Pitch_{moire}$ corresponding to pixel pitch $P_{top\_1}$ and pixel pitch $P_{bottom\_1}$, and calculates moiré pitches $Pitch_{moire}$ corresponding to pixel pitch $P_{top\_2}$ and pixel pitch $P_{bottom\_2}$ respectively by giving a predetermined range of the viewing distance L and/or the distance between the panels K. Accordingly, a preferred combination of pixel pitch $P_{top\_1}$ and pixel pitch $P_{bottom\_1}$ and a preferred combination of pixel pitch $P_{top\_2}$ and pixel pitch $P_{bottom\_2}$ can be decided to prevent the moiré pattern from being seen by the user. As mentioned above, the pixel pitch $P_{top\_1}$ of the pixel structures 115 on the first display panel 110 is preferably different from the pixel pitch $P_{bottom\_1}$ of the pixel structures 125 on the second display panel 120. In addition, the pixel pitch $P_{top\_2}$ of the pixel structures 115 on the first display panel 110 is preferably different from the pixel pitch $P_{bottom\_2}$ of the pixel structures 125 on the second display panel 120.

Referring to the equation (18). When the pixel pitch $P_{top}$ of the pixel structures 115 on the first display panel 110 is equal to the pixel pitch $P_{bottom}$ of the pixel structures 125 on the second display panel 120, the ratio $P_{top}/P_{bottom}$ is equal to 1. In addition, because the pixel pitch $P_{top}$ is equal to the pixel pitch $P_{bottom}$, the intensity of the moiré pattern corresponding to m=1 and n=1 is far larger than that of other sets (m,n). Accordingly, the moiré pattern corresponding to m=1 and n=1 is considered, and the moiré patterns of other sets (m,n) are ignored. Therefore, m=1 and n=1 are substituted into the equation (18) and the equation (18) can be rewritten as the following equation (19).

$$Pitch_{moire} = \frac{P_{top}}{\left|\frac{n_L}{L} \times \frac{K}{n_K}\right|} = \frac{P_{top}}{\left|\frac{K'}{L'}\right|} \qquad (19)$$

As shown in the equation (19), when the pixel pitch $P_{top}$ of the pixel structures 115 on the first display panel 110 is equal to the pixel pitch $P_{bottom}$ of the pixel structures 125 on the second display panel 120, the moiré pitch $Pitch_{moire}$ may be set to be less than 0.5 mm by adjusting the effective distance between the panels K' and the pixel pitch of the pixel structures on the display panels in a predetermined range of the viewing distance L'. For example, in the situation that the pitches of the pixel structures on the two display panels are the same, the moiré pitch $Pitch_{moire}$ may be set to be less than 0.5 mm by decreasing the pitches of the pixel structures of the panels and increasing the effective distance K' between the panels in the predetermined range of effective viewing distance L'. Moreover, when the pitches of the pixel structures on the two display panels are the same and are equal to P μm (P is a real number), the effective distance between the panels K' preferably satisfies the following equation (20) while the predetermined maximum effective viewing distance is $L'_{max}$ mm and the predetermined minimum effective viewing distance is $L'_{min}$ mm. That is to say, K' should be greater than $1/500(L'_{max} \times P)$ mm so that the pitch Pitch$_{moire}$ will be less than 0.5 mm in the predetermined range of the view distance from L'$_{min}$ to L'$_{max}$.

$$K'>1/500(L'_{max} \times P) \quad (20)$$

Referring to FIG. 2 and FIG. 9, in the embodiment of FIG. 9, the thickness d$_1$ is 0.135 mm; the thickness d$_2$ is 0.4 mm; the thickness d$_3$ is 0.4 mm; the thickness d$_4$ is 0 mm; the thickness d$_5$ is 0 mm; the thickness d$_6$ is 0.2 mm; the thickness d$_7$ is 0.2 mm; the thickness d$_8$ is 0.135 mm; the pitch P$_{top}$, and pitch P$_{bottom}$ are 38 μm. The first row in the table is the effective viewing distance L', labeled as x from 500 mm to 1500 mm; the first column is the effective distance between the panels K', labeled as y from 0 mm to 50 mm; the other numbers are the moiré pitches Pitch$_{moire}$ with unit of mm. As shown in the table, when the effective distance between the panels K' is less or equal to 35 mm, the moiré pitch Pitch$_{moire}$ is greater than 500 μm while the effective viewing distance is in the range from 500 mm to 1500 mm; but the moiré pitch Pitch$_{moire}$ may be less than 500 μm in a partial range of x while y is greater or equal to 40.

As shown in the equation (20), when the pixel pitch P$_{top}$ of the pixel structures 115 on the first display panel 110 and the pixel pitch P$_{bottom}$ of the pixel structures 125 on the second display panel 120 are the same and equal to 38 μm, the effective distance K' should be greater than 38 μm while the effective viewing distance L' is 500 mm to generate a moiré pitch Pitch$_{moire}$ less than 500 μm. When the viewing distance L' is 600 mm, the effective distance between the panels K' should be greater than 45.6 μm to generate a moiré pitch Pitch$_{moire}$ less than 500 μm. Referring to FIG. 9, the calculation results of the equation (20) match the results in the table of FIG. 9. Therefore, in the embodiment that the pitches of the pixel structures on the two display panels are the same and equal to P μm and the effective viewing distance L' is in the range from 500 mm to 1500 mm, the effective distance between the panels K' should be greater than 3 P mm so that the moiré pitch Pitch$_{moire}$ will be less than 500 μm.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
    a first display panel, comprising:
        a first polarizer, a first substrate, a second substrate and a plurality of first pixel structures, wherein the first substrate is disposed between the first polarizer and the second substrate, and the first pixel structures have a first pixel pitch; and
    a second display panel, comprising:
        a third substrate, a fourth substrate, a second polarizer and a plurality of second pixel structures, wherein the fourth substrate is disposed between the third substrate and the second polarizer, the third substrate is disposed between the second substrate and the fourth substrate, and the second pixel structures have a second pixel pitch, wherein
    the first polarizer has a thickness d$_1$ and a refractive index n$_1$;
    the first substrate has a thickness d$_2$ and a refractive index n$_2$;
    the second substrate has a thickness d$_3$ and a refractive index n$_3$; and
    the third substrate has a thickness d$_6$ and a refractive index n$_6$;
    a moiré pitch of a moiré pattern generated by the display device is calculated according to the following relationships:

$$Pitch_{moire} = \left( \frac{L' + d'_1 + d'_2}{\left| \frac{n \times (L' + d'_1 + d'_2 + d'_3 + K' + d'_6)}{P_{bottom}} - \frac{m \times (L' + d'_1 + d'_2)}{P_{top}} \right|} \right);$$

$$L' = \frac{L}{n_L}; K' = \frac{K}{n_K}; \text{ and } d'_i = \frac{d_i}{n_i}, i = 1, 2, 3, 6,$$

wherein m and n are positive integers, L represents a viewing distance between a user and the first display panel, K represents a distance between the first display panel and the second display panel, P$_{top}$ represents the first pixel pitch, P$_{bottom}$ represents the second pixel pitch, n$_L$ represents a refractive index of a medium between the user and the first display panel, n$_K$ represents a refractive index of a medium between the first display panel and the second display panel,
    wherein for each set of (m,n) in a range of m+n≤9, the moiré pitch is less than 500 micrometer.

2. The display device of claim 1, wherein the first pixel pitch is different from the second pixel pitch.

3. The display device of claim 2, wherein the first pixel pitch is smaller than the second pixel pitch.

4. The display device of claim 1, wherein the first display panel is bonded to the second display panel by an adhesive layer.

5. The display device of claim 4, wherein material of the adhesive layer comprises an adhesive which is a frame-shape adhesive, a film-type adhesive or a liquid-type adhesive.

6. The display device of claim 1, wherein a ratio K/n$_K$ of the distance K to the refractive index n$_K$ is in a range from 5 millimeters (mm) to 10 mm.

7. The display device of claim 1, wherein the first pixel pitch is equal to the second pixel pitch, and the distance K between the first display panel and the second display panel satisfies the following relationship:

$$K'>1/500(L' \times P),$$

wherein P$_{top}$=P$_{bottom}$=P, a unit of L' is millimeter, a unit of P is micrometer, and a unit of K is millimeter.

8. A display device comprising:
    a first display panel comprising:
        a first polarizer, a first substrate, a second substrate and a plurality of first pixel structures, wherein the first substrate is disposed between the first polarizer and the second substrate, and the first pixel structures have a first pixel pitch; and
    a second display panel comprising:
        a third substrate, a fourth substrate, a second polarizer and a plurality of second pixel structures, wherein the fourth substrate is disposed between the third substrate and the second polarizer, the third substrate is disposed between the second substrate and the fourth substrate, and the second pixel structures have a second pixel pitch, wherein one of the first display panel and the second display panel further comprises a third polarizer disposed between the second substrate and the third substrate;

the first polarizer has a thickness $d_1$ and a refractive index $n_1$;

the first substrate has a thickness $d_2$ and a refractive index $n_2$;

the second substrate has a thickness $d_3$ and a refractive index $n_3$;

the third polarizer has a thickness $d_4$ and a refractive index $n_4$;

the third substrate has a thickness $d_6$ and a refractive index $n_6$;

wherein a moiré pitch of a moiré pattern generated by the display device is calculated according to the following relationships:

$$Pitch_{moire} = \left(\frac{L' + d_1' + d_2'}{\left|\frac{n \times (L' + d_1' + d_2' + d_3' + d_4' + K' + d_6')}{P_{bottom}} - \frac{m \times (L' + d_1' + d_2')}{P_{top}}\right|}\right);$$

$$L' = \frac{L}{n_L}; K' = \frac{K}{n_K}; \text{ and } d_i' = \frac{d_i}{n_i}, i = 1, 2, 3, 6,$$

wherein m and n are positive integers, L represents a viewing distance between a user and the first display panel, K represents a distance between the first display panel and the second display panel, $P_{top}$ represents the first pixel pitch, $P_{bottom}$ represents the second pixel pitch, $n_L$ represents a refractive index of a medium between the user and the first display panel, $n_K$ represents a refractive index of a medium between the first display panel and the second display panel, wherein for each set of (m,n) in a range of m+n≤9, the moiré pitch is less than 500 micrometer.

9. The display device of claim 8, wherein the first pixel pitch is different from the second pixel pitch.

10. The display device of claim 9, wherein the first pixel pitch is smaller than the second pixel pitch.

11. The display device of claim 8, wherein a ratio $K/n_K$ of the distance K to the refractive index $n_K$ is in a range from 5 millimeters (mm) to 10 mm.

12. The display device of claim 8, wherein the first pixel pitch is equal to the second pixel pitch, and the distance K between the first display panel and the second display panel satisfies the following relationship:

$K' > 1/500(L' \times P),$ wherein $P_{top} = P_{bottom}$ P, a unit of L' is millimeter, a unit of P is micrometer, and a unit of K is millimeter.

13. A display device comprising:
a first display panel, comprising:
a first polarizer, a first substrate, a second substrate, a third polarizer and a plurality of first pixel structures, wherein the first substrate is disposed between the first polarizer and the second substrate, the second substrate is disposed between the first substrate and the third polarizer, and the first pixel structures have a first pixel pitch; and a second display panel, comprising:
a fourth polarizer, a third substrate, a fourth substrate, a second polarizer and a plurality of second pixel structures, wherein the third substrate is disposed between the fourth polarizer and the fourth substrate, the fourth substrate is disposed between the third substrate and the second polarizer, the fourth polarizer is disposed between the third polarizer and the third substrate, and the second pixel structures have a second pixel pitch, wherein the first polarizer has a thickness $d_1$ and a refractive index $n_1$;

the first substrate has a thickness $d_2$ and a refractive index $n_2$;

the second substrate has a thickness $d_3$ and a refractive index $n_3$;

the third polarizer has a thickness $d_4$ and a refractive index $n_4$;

the fourth polarizer has a thickness $d_5$ and a refractive index $n_s$; and the third substrate has a thickness $d_6$ and a refractive index $n_6$;

a moiré pitch of a moiré pattern generated by the display device is calculated according to the following relationships:

$$Pitch_{moire} = \left(\frac{L' + d_1' + d_2'}{\left|\frac{n \times (L' + d_1' + d_2' + d_3' + d_4' + K' + d_5' + d_6')}{P_{bottom}} - \frac{m \times (L' + d_1' + d_2')}{P_{top}}\right|}\right);$$

$$L' = \frac{L}{n_L}; K' = \frac{K}{n_K}; \text{ and } d_i' = \frac{d_i}{n_i}, i = 1 \text{ to } 6,$$

wherein m and n are positive integers, L represents a viewing distance between a user and the first display panel, K represents a distance between the first display panel and the second display panel, $P_{top}$ represents the first pixel pitch, $P_{bottom}$ represents the second pixel pitch, $n_L$ represents a refractive index of a medium between the user and the first display panel, $n_K$ represents a refractive index of a medium between the first display panel and the second display panel, wherein for each set of (m,n) in a range of m+n≤9, the moiré pitch is less than 500 micrometer.

14. The display device of claim 13, wherein the first pixel pitch is different from the second pixel pitch.

15. The display device of claim 14, wherein the first pixel pitch is smaller than the second pixel pitch.

16. The display device of claim 13, wherein a ratio $K/n_K$ of the distance K to the refractive index $n_K$ is in a range from 5 millimeters (mm) to 10 mm.

17. The display device of claim 13, wherein the first pixel pitch is equal to the second pixel pitch, and the distance K between the first display panel and the second display panel satisfies the following relationship:

$K' > 1/500(L' \times P),$ wherein $P_{top} = P_{bottom}$ P, a unit of L' is millimeter, a unit of P is micrometer, and a unit of K is millimeter.

\* \* \* \* \*

UNITED STATES PATENT AND TRADEMARK OFFICE
CERTIFICATE OF CORRECTION

PATENT NO. : 10,656,434 B2  
APPLICATION NO. : 15/642352  
DATED : May 19, 2020  
INVENTOR(S) : Yu-Chen Liu, Wei-Chih Hsu and Yen-Chung Chen Page 1 of 1

It is certified that error appears in the above-identified patent and that said Letters Patent is hereby corrected as shown below:

In the Specification (1) In Column 18, Line 67 reads as "1/500(L'$_{max}$×P)", but it should read as "$\frac{1}{500}(L'_{max} \times P)$".

(2) In Column 19, Line 5 reads as "$K'$>1/500($L'_{max}$×$P$)", but it should read as "$K' > \frac{1}{500}(L'_{max} \times P)$".

In the Claims (3) In Column 20, Line 53, Claim 7 reads as "$K'$>1/500($L'$×$P$),", but it should read as "$K' > \frac{1}{500}(L' \times P)$".

(4) In Column 21, Line 29, Claim 8 reads as "$d'_i = \frac{d_i}{n_i}, i = 1,2,3,6$", but it should read as "$d'_i = \frac{d_i}{n_i}, i = 1,2,3,4,6$".

(5) In Column 21, Line 54, Claim 12 reads as "$K'$>1/500($L'$×$P$),", but it should read as "$K' > \frac{1}{500}(L' \times P)$".

(6) In Column 22, Line 61, Claim 17 reads as "$K'$>1/500($L'$×$P$),", but it should read as "$K' > \frac{1}{500}(L' \times P)$".

Signed and Sealed this  
Third Day of November, 2020

Andrei Iancu  
*Director of the United States Patent and Trademark Office*